United States Patent
Matsuda et al.

(10) Patent No.: US 11,608,069 B2
(45) Date of Patent: Mar. 21, 2023

(54) POWERTRAIN SYSTEM

(71) Applicant: Toyota Jidosha Kabushiki Kaisha, Toyota (JP)

(72) Inventors: Kazuhisa Matsuda, Shizuoka-ken (JP); Shuntaro Okazaki, Shizuoka-ken (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 120 days.

(21) Appl. No.: 17/155,519

(22) Filed: Jan. 22, 2021

(65) Prior Publication Data

US 2021/0229665 A1 Jul. 29, 2021

(30) Foreign Application Priority Data

Jan. 28, 2020 (JP) .............................. JP2020-011556

(51) Int. Cl.
  *B60W 30/188* (2012.01)
  *B60W 20/10* (2016.01)
  *B60W 10/06* (2006.01)
  *B60W 10/08* (2006.01)

(52) U.S. Cl.
  CPC .......... *B60W 30/188* (2013.01); *B60W 10/06* (2013.01); *B60W 10/08* (2013.01); *B60W 20/10* (2013.01); *B60W 2510/0638* (2013.01); *B60W 2510/081* (2013.01); *B60W 2710/0666* (2013.01); *B60W 2710/083* (2013.01)

(58) Field of Classification Search
  CPC ....... B60W 30/188; B60W 2050/0027; B60W 2710/0666; B60W 10/06; B60W 10/08; B60W 20/10; B60W 2710/083; B60W 2510/081; B60W 2510/0638; B60W 20/11

USPC ........................................................... 477/3
  See application file for complete search history.

(56) References Cited

U.S. PATENT DOCUMENTS 8,138,703 B2 *  3/2012  Heap ..................... B60K 6/547
                                                318/434
11,208,092 B2 * 12/2021  Shibaike ............... B60W 20/11
(Continued)

FOREIGN PATENT DOCUMENTS

| JP | 2009-047099 A | 3/2009 |
| JP | 2020-090269 A | 6/2020 |
| JP | 2021115994 A * | 8/2021 |

*Primary Examiner* — Roger L Pang
(74) *Attorney, Agent, or Firm* — Dinsmore & Shohl LLP

(57) ABSTRACT

In a powertrain system including a first torque device and a second torque device having a larger response delay, a control device is configured to act as: a manipulated variable determination section that solves a linear programming problem to determine and output manipulated variables that maximally achieve target state quantities within a plurality of constraints; and a torque device control section. The plurality of constraints include, as upper and lower limit constraint values of the second manipulated variable, a maximum value and a minimum value of the second manipulated variable attainable at the next time step. The control device is further configured to act as a manipulated variable upper and lower limit calculation section that calculates, as the upper and lower limit constraint values, the above-described maximum value and the minimum value, based on the current rotational speed and estimated manipulated variable of the second torque device.

6 Claims, 16 Drawing Sheets

(56) References Cited

U.S. PATENT DOCUMENTS

| | | | |
|---|---|---|---|
| 2009/0118943 A1* | 5/2009 | Heap | B60W 10/02 |
| | | | 701/55 |
| 2010/0138077 A1 | 6/2010 | Kawai | |
| 2014/0046519 A1* | 2/2014 | Diaz | B60W 10/105 |
| | | | 180/65.23 |
| 2020/0164858 A1 | 5/2020 | Shibaike | |

* cited by examiner

POWERTRAIN SYSTEM

CROSS-REFERENCE TO RELATED APPLICATION

The present disclosure claims priority under 35 U.S.C. § 119 to Japanese Patent Application No. 2020-011556, filed on Jan. 28, 2020. The content of which is incorporated herein by reference in its entirety.

BACKGROUND

Technical Field

The present disclosure relates to a powertrain system, and more particularly to a powertrain system provided with a plurality of torque devices associated with the control of driving force of a vehicle.

Background Art

For example, JP 2009-047099 A discloses a vehicle control device. According to this vehicle control device, requests are output to a plurality of kinds of control parameters of the vehicle from each of a plurality of control logics having individual purposes. The control parameters mentioned here are, for example, torque and air-fuel ratio of an internal combustion engine, and the individual purposes are, for example, to reduce exhaust gas emission and fuel consumption. In the vehicle control device, the output requests are arbitrated for every kind of control parameter, and as a result, target values of the respective control parameters are determined. In addition, information on the priority order among the requests described above is also output from the individual control logics. As a result, according to vehicle control device described above, when determining the target values of the respective control parameters, the requests from the plurality of control logics are arbitrated on the basis of the output priority order.

SUMMARY

A powertrain system is known which includes a plurality of torque devices (for example, internal combustion engine and motor generator) associated with the control of the driving force of a vehicle. In this kind of powertrain system, it is favorable to determine a plurality of manipulated variables (for example, engine torque and electric motor torque) of the plurality of torque devices so as to maximally achieve the respective target state quantities of a plurality of state quantities (for example, vehicle driving torque and charge/discharge amount of a battery) that are to be controlled.

In this context, the state quantities and the manipulated variables of the powertrain system have various constraints. Therefore, it is favorable to be able to determine the manipulated variables such that the target state quantities are maximally achieved within this kind of constraints. It is also favorable that a control structure serving as a basis of a torque device control that is to be built have a versatility which can be easily applied to other powertrain systems having different configurations.

In order to satisfy the requirements described above, it is conceivable to solve a linear programming problem to determine a combination of optimal manipulated variables that maximally achieve a plurality of target state quantities within a range satisfying a plurality of constraints of the powertrain system, based on a linear state equation that defines a relationship between a plurality of state quantities to be controlled and a plurality of manipulated variables of a plurality of torque devices. On the other hand, the plurality of torque devices described above may include a first torque device (e.g., a motor generator) and a second torque device (e.g., an internal combustion engine) having a larger output response delay than that of the first torque device. In order to appropriately determine all the manipulated variables at the same time when the first torque device and the second torque device having different responsiveness are included in this way, it is conceivable to adopt the following method.

That is, first, by solving the linear programming problem as described above, a combination of the optimal manipulated variables of the first torque device and the second torque device is calculated. Then, while commanding the calculated manipulated variable to the second torque device having a larger response delay, a predicted manipulated variable that reflects the response delay of the output of the second torque device with respect to this manipulated variable is calculated. Then, based on the state equation to which this predicted manipulated variable is substituted, it is conceivable to determine an optimal manipulated variable of the remaining first torque device by solving the linear programming problem again. However, according to the method as described above, it is necessary to perform a recalculation (that is, to search for optimal manipulated variables twice) in order to determine the combination of the optimal manipulated variables of all the first and second torque devices. This leads to an increase in the amount of calculation (an increase in the calculation load) of the control device.

The present disclosure has been made in view of the problem described above, and an object of the present disclosure is to provide a powertrain system configured such that, even when first and second torque devices having different responsiveness are included, the manipulated variables of each of the first and second torque devices are appropriately determined so as to maximally achieve a plurality of target state quantities while satisfying a plurality of constraints and is also configured to reduce an increase in the amount of calculation, which can build a highly versatile control structure (control platform).

A powertrain system according to the present disclosure includes: first and second torque devices associated with control of a driving force of a vehicle; and a control device configured to control the first and second torque devices. The second torque device has a larger output response delay than that of the first torque device. The control device is configured to act as: a manipulated variable determination section that solves a linear programming problem to determine and output, based on a linear state equation that defines a relationship between a plurality of state quantities controlled by the powertrain system and first and second manipulated variables that are respective manipulated variables of the first and second torque devices, the first and second manipulated variables such that a plurality of target state quantities that are target values of the plurality of state quantities are maximally achieved within a plurality of constraints of the powertrain system; and a torque device control section that controls the first and second torque devices in accordance with the first and second manipulated variables output from the manipulated variable determination section. The plurality of constraints include, as upper and lower limit constraint values of the second manipulated variable, a maximum value and a minimum value of an attainable manipulated variable that is the second manipulated variable attainable at a next time step. The control device is further configured to act as a manipulated variable upper and lower limit calculation section that calculates, as the upper and lower limit constraint values of the second manipulated variable, the maximum value and the minimum value of the attainable manipulated variable, based on a rotational speed and an estimated manipulated variable of the second torque device at a current time step.

The manipulated variable determination section may further include a manipulated variable correction section that corrects a determined value of the second manipulated variable determined by solving the linear programming problem. The manipulated variable correction section may correct the determined value in accordance with an inverse characteristic of a response delay characteristic of the second torque device to calculate a corrected second manipulated variable in which the determined value is achieved at the next time step. The manipulated variable determination section may output the corrected second manipulated variable to the torque device control section.

The manipulated variable determination section may be further configured to solve the linear programming problem to determine, within the plurality of constraints, the first and second manipulated variables that maximally achieve each of the plurality of target state quantities in descending order of priority.

When the first and second manipulated variables are not determined while complying with the plurality of constraints, the manipulated variable determination section may determine the first and second manipulated variables while relaxing at least one of the plurality of constraints in ascending order of priority.

The plurality of constraints may include: one or more first constraints regarding the plurality of target state quantities; and one or more second constraints regarding at least one of upper limit constraint value and lower limit constraint value of the plurality of state quantities. The priority given to the one or more second constraints may be higher than that given to the one or more first constraints.

The plurality of constraints may include a plurality of second constraints regarding at least one of upper limit constraint value and lower limit constraint value of the plurality of state quantities. In relaxing the plurality of second constraints when the first and second manipulated variables are not determined while complying with the plurality of constraints, the manipulated variable determination section may relax the plurality of second constraints while minimizing an excess amount with respect to the upper limit constraint value or the lower limit constraint value associated with each of the plurality of second constraints in descending order of the priority.

According to the powertrain system of the present disclosure, by solving the linear programming problem based on the linear state equation that defines the relationship between the plurality of state quantities controlled by the powertrain system and the manipulated variables of the first and second torque devices, the manipulated variables of the first and second torque devices (the first and second manipulated variables) can be determined such that the plurality of target state quantities are maximally achieved within the plurality of constraints. Then, the first and second torque devices can be controlled in accordance with the determined first and second manipulated variables.

Moreover, according to the powertrain system of the present disclosure, the linear state equation is used to define the relationship between the plurality of state quantities (the plurality of control variables) and the first and second manipulated variables in the driveline of the powertrain system. The state equation of the driveline of the powertrain system is linear without depending on the system configuration. Therefore, it is possible to build a highly versatile control structure that can be easily applied to other powertrain systems including any first and second torque devices, by properly changing the type and number of the state quantities and manipulated variables substituted into the state equation.

Furthermore, according to the powertrain system of the present disclosure, the constraints of the powertrain system include, as the upper and lower limit constraint values of the second manipulated variable, the maximum value and the minimum value of the attainable manipulated variable that is the second manipulated variable attainable at the next time step. The upper and lower limit constraint values regarding this attainable manipulated variable are calculated based on the rotational speed and the estimated manipulated variable of the second torque device at the current time step. By using this kind of upper and lower limit constraint values, the manipulated variable determination section can appropriately determine all the manipulated variables including the second manipulated variable (i.e., the first and second manipulated variables) while selecting the second manipulated variable within the range of the second manipulated variable that is attainable at the next time step (i.e., the range identified by the above-described upper and lower limit constraint values). In other words, it is possible to appropriately determine all the manipulated variables only by once searching for the optimal manipulated variable (i.e., with the reduction of an increase in the amount of calculation) while considering the response delay of the second torque device.

DETAILED DESCRIPTION

Figure 1:
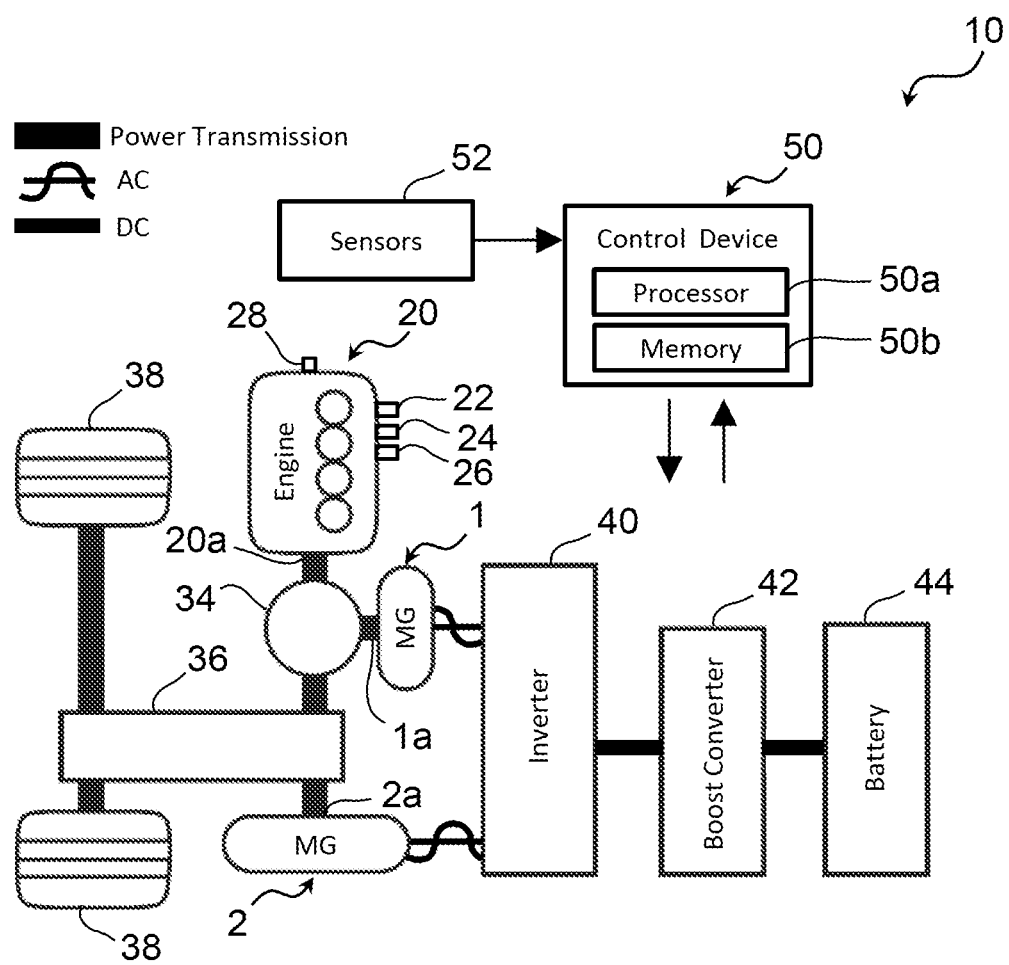
FIG. 1 is a schematic diagram used to describe an example of a configuration of a powertrain system according to a first embodiment of the present disclosure.

In the following, embodiments of the present disclosure will be described with reference to the accompanying drawings. However, the same components in the drawings are denoted by the same reference numerals, and redundant descriptions thereof are omitted or simplified. Moreover, it is to be understood that even when the number, quantity, amount, range or other numerical attribute of an element is mentioned in the following description of the embodiments, the present disclosure is not limited to the mentioned numerical attribute unless explicitly described otherwise, or unless the present disclosure is explicitly specified by the numerical attribute theoretically.

1. First Embodiment

A first embodiment according to the present disclosure will be described with reference to FIGS. 1 to 7.

1-1. Example of Configuration of Powertrain System

FIG. 1 is a schematic diagram used to describe an example of the configuration of a powertrain system 10 according to the first embodiment of the present disclosure. The powertrain system 10 shown in FIG. 1 is provided with two motor generators (i.e., motor generator (MG) 1 and motor generator (MG) 2) together with an internal combustion engine 20, as power sources of a vehicle. That is, the powertrain system 10 is applied to a hybrid vehicle as an example.

As an example, the internal combustion engine 20 is a spark ignition engine. However, an internal combustion engine according to the present disclosure may alternatively be a compression ignition engine, and the number and arrangement of cylinders thereof are not particularly limited. As actuators for controlling engine torque Te, the internal combustion engine 20 is equipped with a throttle valve 22, fuel injection valves 24 and an ignition device 26. The throttle valve 22 is arranged in an intake air passage (not shown) and controls intake air flow rate. Each of the fuel injection valves 24 is arranged for its corresponding cylinder, and injects fuel, for example, directly into its corresponding cylinder. The ignition device 26 ignites an air-fuel mixture in each cylinder by the use of a spark plug arranged for each cylinder. In addition, the internal combustion engine 20 is provided with various sensors used in various engine controls. The various sensors mentioned here include a crank angle sensor 28 that outputs a signal responsive to crank angle.

The MG 1 and the MG 2 are both electric motors that can generate electric power. That is, the MG 1 and the MG 2 are, for example, alternate current synchronous motor generators having both a function as an electric motor that outputs a torque using a supplied electric power and a function as a generator that transduces an inputted mechanical power into the electric power. According to the powertrain system 10 shown in FIG. 1, the MG 1 is mainly used as a generator, and the MG 2 is mainly used as an electric motor for driving the vehicle.

The internal combustion engine 20, the MG 1 and the MG 2 are connected to wheels 38 via a power split device 34 and a speed reducer 36. The power split device 34 is, for example, a planetary gear unit and splits the engine torque Te output from the internal combustion engine 20 into the MG 1 and the wheels 38. To be more specific, in the power split device 34: a sun gear is connected to an output shaft 1a of the MG 1; a planetary carrier is connected to a crankshaft 20a of the internal combustion engine 20; and a ring gear is connected to an output shaft 2a of the MG 2. The engine torque Te output from the internal combustion engine 20 or MG2 torque Tm outputted from the MG 2 is transmitted to the wheels 38 via the speed reducer 36. That is, the internal combustion engine 20 and the MG 2 generate the driving force of the vehicle and control the driving force of the vehicle. The MG 1 can regenerate electric power using the engine torque Te supplied from the internal combustion engine 20 via the power split device 34. Because of this, the MG 1 is also used to control the driving force of the vehicle. In addition, the MG 2 functions as a generator during the braking of the vehicle, and recovers the kinetic energy of the vehicle to convert it to electric power.

The MG 1 and the MG 2 each exchange electric power with a battery 44 via an inverter 40 and a boost converter 42. The inverter 40 is configured to convert the electric power stored in the battery 44 from direct current (DC) to alternating current (AC) to supply this AC electric power to the MG 2, and to convert the electric power generated by the MG 1 and the MG 2 from AC to DC to store this DC electric power in the battery 44. Because of this, the battery 44 is charged with the electric power generated by the MG 1 and the MG 2, and the electric power stored in the battery 44 is discharged when it is consumed by the MG 2. The boost converter 42 boosts the voltage of the battery 44 as necessary.

The powertrain system 10 according to the present embodiment is further provided with a control device 50 for controlling the powertrain (the internal combustion engine 20, the MG 1 and the MG 2). The control device 50 is an electronic control unit (ECU) that includes a processor 50a and a memory 50b. The memory 50b stores programs for controlling the powertrain system 10. The processor 50a reads out a program from the memory 50b to execute the program. The control device 50 receives sensor signals from various sensors for controlling the powertrain. Moreover, the processor 50a executes various programs using the received sensor signals and outputs actuating signals for operating various actuators of the powertrain.

The control device 50 is electrically connected to the various sensors used for the control of the powertrain, such as an accelerator position sensor, a brake position sensor, a vehicle speed sensor, and sensors 52 including a current sensor and a rotation angle sensor of each of the MG 1 and MG 2, in addition to the aforementioned various sensors for the engine controls, such as the crank angle sensor 28. The control device 50 can calculate an engine speed Ne by the use of the signals of the crank angle sensor 28. Also, the control device 50 can calculate an engine torque Te (estimated torque Test) from the torque reaction force of the internal combustion engine 20 detected via the MG 1.

Furthermore, the control device 50 is electrically connected to the various actuators for controlling the powertrain including the internal combustion engine 20 (the throttle valve 22, the fuel injection valves 24 and the ignition device 26), the MG 1 and the MG 2. It should be noted that the control device 50 may alternatively be configured with a plurality of ECUs.

1-2. Torque Device Control According to First Embodiment

1-2-1. Outline of Torque Device Control

Figure 2:
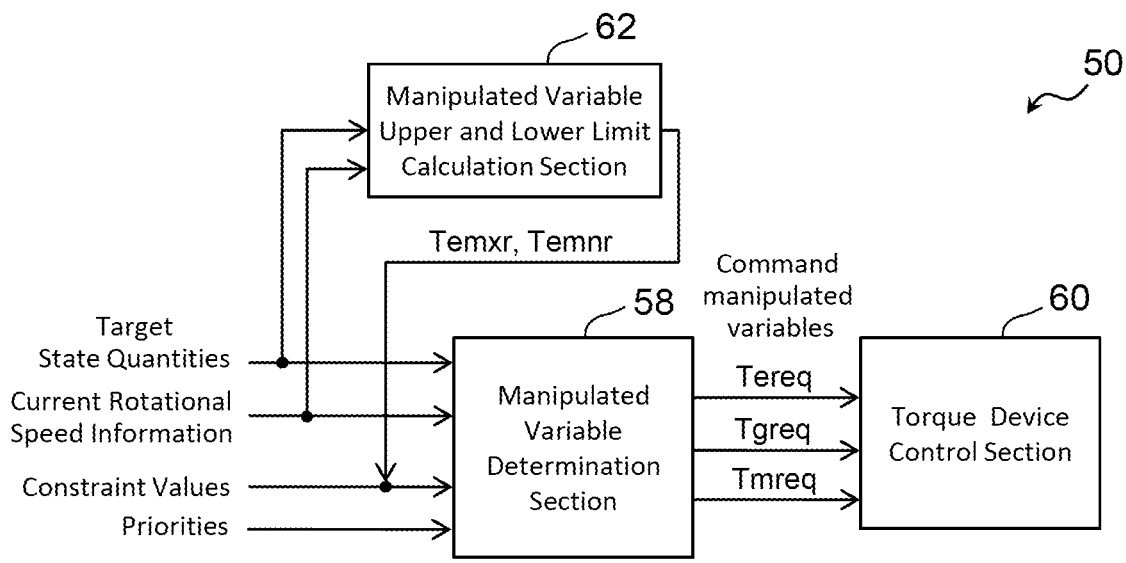
FIG. 2 is a block diagram that illustrates a functional configuration of a control device related to a torque device control according to the first embodiment of the present disclosure.

As described above, the internal combustion engine 20, the MG 1 and the MG 2 correspond to the torque devices included in the powertrain system 10. FIG. 2 is a block diagram that illustrates a functional configuration of the control device 50 related to a torque device control according to the first embodiment of the present disclosure. The control device 50 includes a "manipulated variable determination section 58", a "torque device control section 60" and a "manipulated variable upper and lower limit calculation section 62" in order to perform the torque device control.

As an example, state quantities controlled by the powertrain system 10 (i.e., control variables) in the present embodiment are a driving torque Tp, a charge/discharge amount Pchg and a rotational speed change rate dNg. The driving torque Tp denotes the driving torque (Nm) of the wheels 38 correlated with the vehicle driving force. The charge/discharge amount Pchg denotes the charge/discharge amount (W) of the battery 44, and is herein assumed to become negative during charging and become positive during discharging. The rotational speed change rate dNg denotes the rotational speed change rate (Rad/s$^2$) of the MG 1.

It should be noted that, in the example of using the power split device 34 shown in FIG. 1, the rotational speed Nm of the MG 2 can be determined in accordance with the vehicle speed. Because of this, there is a relationship that, if the rotational speed Ng of the MG 1 is also determined, the remaining engine speed Ne is determined accordingly. Therefore, according to the present embodiment, the rotational speed change rate dNg is included as one of the state quantities (control variables) that are to be controlled. Moreover, instead of the rotational speed change rate dNg of the MG 1, an engine speed change rate dNe may be used as one of the control variables. In this example, a similar control to when the MG 1 rotational speed change rate dNg is used can also be achieved based on the relationship described above. Furthermore, instead of the rotational speed change rates dNg and dNe, the MG 1 rotational speed change rate dNg itself or the engine speed Ne (rad/s) itself, for example, may alternatively be used.

(Manipulated Variable Determination Section)

The manipulated variable determination section 58 determines optimal manipulated variables for controlling the above-described state quantities (Tp, Pchg and dNg) such that they approach the respective target state quantities that are target values of thereof. Because of this, the manipulated variable determination section 58 has a function as an optimal manipulated variable searcher. As an example, the manipulated variables used in the present embodiment are the engine torque Te, the MG1 torque Tg and the MG2 torque Tm.

Formula (1) described below indicates state equations that illustrate a relationship between the control variables (Tp, Pchg and dNg) and the manipulated variables (Te, Tg and Tm). As shown in this formula (1), the relationship between the control variables and the manipulated variables in the powertrain system 10 can be expressed in linear equations.

$$\begin{bmatrix} Tp \\ Pchg \\ dNg \end{bmatrix} = \begin{bmatrix} c11 & c12 & c13 \\ c21 & c22 & c23 \\ c31 & c32 & c33 \end{bmatrix} \begin{bmatrix} Te \\ Tg \\ Tm \end{bmatrix} \quad (1)$$

In formula (1), reference characters c ($c_{11}$, $c_{12}$, . . . ) denotes constant values determined depending on the hardware specifications of the powertrain system 10 (for example, inertia and gear ratio of each part of the powertrain) except reference characters $c_{22}$ and $c_{23}$ concerning the charge/discharge amount Pchg and the torques Tg and Tm. The reference characters $c_{22}$ and $c_{23}$ vary depending on changes in the rotational speeds Ng and Nm during the operation.

The manipulated variable determination section 58 solves a linear programming problem to determine the manipulated variables of the torque devices that maximally achieve the target state quantities within constraints of the powertrain system 10, based on the state equations of formula (1). Moreover, the manipulated variable determination section 58 outputs (sends) the determined manipulated variables (Tereq, Tgreq and Tmreq) to the torque device control section 60.

Furthermore, according to the manipulated variable determination section 58 of the present embodiment, the priority of three target state quantities (Tp, Pchg and dNg) is taken into consideration in order to determine the manipulated variables. In detail, the manipulated variables that achieve each of the three target state quantities (Tp, Pchg and dNg) to the maximum extent possible in descending order of priority (i.e., in order from the highest priority) are determined by solving the linear programming problem while satisfying the constraints described above. Because of this, as shown in FIG. 2, the priority is inputted to the manipulated variable determination section 58 in addition to the target state quantities and various constraint values of the constraints. In addition, in order to determine the reference characters $c_{22}$ and $c_{23}$, the current rotational speed information (i.e., the MG1 rotational speed Ng (or the engine speed Ne) and the MG2 rotational speed Nm (or the vehicle speed)) is inputted to the manipulated variable determination section 58.

(Torque Device Control Section)

The torque device control section 60 shown in FIG. 2 controls the torque devices (the internal combustion engine 20, the MG 1 and the MG 2) in accordance with the respective manipulated variables (Tereq, Tgreq and Tmreq) determined by the manipulated variable determination section 58. In detail, with regard to the internal combustion engine 20, the torque device control section 60 determines the respective target values of the throttle opening degree, the fuel injection amount and the spark timing that are required to achieve the engine torque Tereq determined by the manipulated variable determination section 58. As a result, the actuators for the engine torque control (the throttle valve 22, the fuel injection valves 24 and the ignition device 26) are controlled such that the individual target values determined by the torque device control section 60 are achieved. With regard to the MG 1 and the MG 2, the torque device control section 60 similarly determines the respective target values of designated control parameters, such as electric current value and frequency, that are required to achieve the MG torques Tgreq and Tmreq determined by the manipulated variable determination section 58. As a result, the MG 1 and the MG 2 are controlled by controlling the inverter 40 such that the individual target values determined by the torque device control section 60 are achieved.

(Objective Function)

Then, an objective function (evaluation function) f1 of the linear programming problem used to determine the manipulated variables in the manipulated variable determination section 58 will be described. Formula (2) described below corresponds to an example of the objective function f1. In more detail, this linear programming problem corresponds to a minimization problem to find a solution that minimizes the objective function f1 under the constraints. Hereunder, for ease of explanation, the present linear programming problem associated with the objective function f1 is also referred to as a "linear programming problem F".

$$\text{Minimization: } f1 = P_1(y_1^- + y_1^+) + P_2(y_2^- + y_2^+) + P_3(y_3^- + y_3^+) \quad (2)$$

In formula (2), $P_1$, $P_2$ and $P_3$ denote the priority of the target state quantities Tp, Pchg and dNg, respectively. According to the present embodiment, as an example, the priority is determined such that the priority $P_1$ of the driving torque Tp becomes the highest, the priority $P_3$ of the rotational speed change rate dNg becomes the second highest, and the priority $P_2$ of the charge/discharge amount Pchg becomes the lowest. According to the present embodiment, the priority is treated as being not changed during the operation of the vehicle. However, which priority of the target state quantities is higher may be changed depending on the configuration of the powertrain system or selected target state quantities.

According to the present embodiment, as an example, the priorities $P_1$-$P_3$ are given as priority order. In detail, in the example of the priority order, the values of the priorities $P_1$-$P_3$ correspond to primitive priority factors associated with the priority orders of the respective target state quantities. As an example according to the present embodiment, the primitive priority factor $P_1$ means a coefficient that is absolutely greater than the primitive priority factor $P_3$, and the primitive priority factor $P_3$ means a coefficient that is absolutely greater than the primitive priority factor $P_2$ (i.e., $P_1 >>> P_3 >>> P_2$). In addition, "what Px is absolutely greater than Py" means satisfying a relationship that, even if any large natural number n is multiplied with respect to the Py, Px does not become equal to or lower than Py. It should be noted that details of the procedure for searching for the manipulated variables (i.e., optimal manipulated variables) that achieve the target state quantities to the maximum extent possible in consideration of the priorities $P_1$-$P_3$ as the priority orders will be descried below along with the processing of step S118.

Furthermore, in formula (2), reference characters $y_1^-$ and $y_1^+$ respectively denote the amounts of shortage and excess of the driving torque Tp with respect to the target value (i.e., the value of the target state quantity), and both are positive values. Thus, the sum $(y_1^- + y_1^+)$ of these reference characters corresponds to the amount of deviation of the driving torque Tp with respect to the target value. Reference characters $y_2^-$ and $y_2^+$ respectively denote the amounts of shortage and excess of the charge/discharge amount Pchg with respect to the target value, and reference characters $y_3^-$ and $y_3^+$ respectively denote the amounts of shortage and excess of the rotational speed change rate dNg with respect to the target value, and the same applies hereafter. According to formula (2), what the amounts of deviation of the state quantities with respect to the target values are small means that the value of the objective function f1 becomes small.

(Constraints)

As an example, the constraints described above are expressed as formulas (3)-(13).

$$c_{11}x_1 + c_{12}x_2 + c_{13}x_3 + y_1^- - y_1^+ = g_1 \quad (3)$$

$$c_{21}x_1 + c_{22}x_2 + c_{23}x_3 + y_2^- - y_2^+ = g_2 \quad (4)$$

$$c_{31}x_1 + c_{32}x_2 + c_{33}x_3 + y_3^- - y_3^+ = g_3 \quad (5)$$

$$Tpmn \leq c_{11}x_1 + c_{12}x_2 + c_{13}x_3 \leq Tpmx \quad (6)$$

$$Win \leq c_{21}x_1 + c_{22}x_2 + c_{23}x_3 \leq Wout \quad (7)$$

$$dNgmn \leq c_{31}x_1 + c_{32}x_2 + c_{33}x_3 \leq dNgmx \quad (8)$$

$$Temnr \leq x_1 Temxr \quad (9)$$

$$0 \leq x_1 \leq Temx \quad (10)$$

$$Tgmn \leq x_2 \leq Tgmx \quad (11)$$

$$Tmmn \leq x_3 \leq Tmmx \quad (12)$$

$$y_i^-, y_i^+ \geq 0 (i=1,2,3) \quad (13)$$

Variables $x_1$, $x_2$ and $x_3$ in each formula described above are respectively associated with the engine torque Te, the MG1 torque Tg and the MG2 torque Tm that are manipulated variables. Reference characters $g_1$, $g_2$ and $g_3$ in formulas (3)-(5) respectively correspond to a target value of the driving torque Tp, a target value of the charge/discharge amount Pchg and a target value of the rotational speed change rate dNg that are state quantities (i.e., specific values of the target state quantities). These formulas (3)-(5) represent relationships between the manipulated variables and the target state quantities including terms $(y_1^- + y_1^+)$ that indicate the amounts of deviation of the state quantities with respect to the target values.

Reference characters Tpmn and Tpmx in formula (6) correspond to a lower limit constraint value and an upper limit constraint value of the driving torque Tp, respectively. Reference characters Win and Wout in formula (7) correspond to a lower limit constraint value and an upper limit constraint value of the charge/discharge amount Pchg, respectively. Reference characters dNgmn and dNgmx in formula (8) correspond to a lower limit constraint value and an upper limit constraint value of the MG1 rotational speed change rate dNg, respectively. That is, each of formulas (6)-(8) indicates a range of the constraints of the respective state quantities (Tp, Pchg and dNg).

Figure 3:
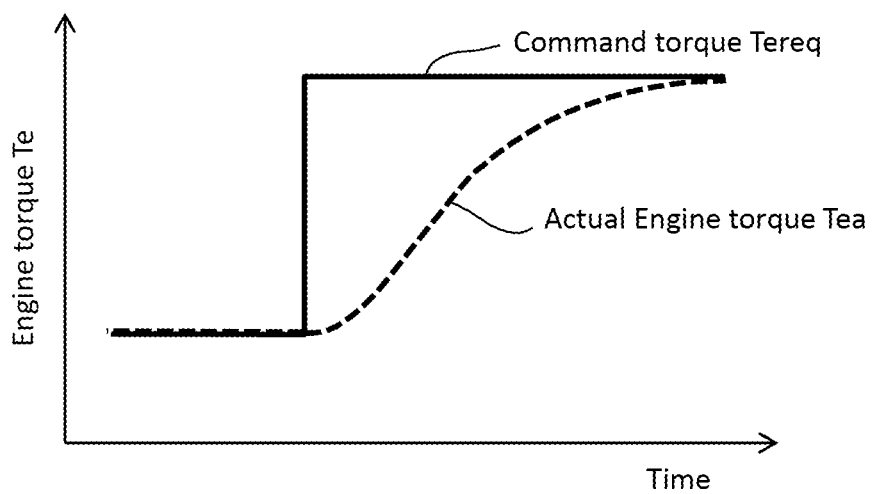
FIG. 3 is a graph that illustrates a response delay of output (actual engine torque Tea) of an internal combustion engine with respect to a change of a command torque Tereq.

The torque devices used in the powertrain system 10 are the internal combustion engine 20, the MG 1 and the MG 2. FIG. 3 is a graph that illustrates a response delay of the output (actual engine torque Tea) of the internal combustion engine 20 with respect to a change of a command engine torque Tereq. Due to the influence of various delay causes, such as a delay of the intake system of the internal combustion engine 20 and a delay of combustion therein, the actual engine torque Tea changes in association with a delay with respect to a change of the command engine torque Tereq (manipulated variable) as shown in FIG. 3. Because of this, a response delay of the actual value of a torque device with respect to a command value thereof is larger in the internal combustion engine 20 than in each of the MG 1 and the MG 2. It should be noted that each of the MG 1 and the MG 2 corresponds to an example of the "first torque device" according to the present disclosure, and the internal combustion engine 20 corresponds to an example of the "second torque device" according to the present disclosure. In addition, each of the MG1 torque Tg and the MG2 torque Tm corresponds to an example of the "first manipulated variable" according to the present disclosure, and the engine torque Te corresponds to an example of the "second manipulated variable" according to the present disclosure.

The control of the powertrain system 10 by the control device 50 is performed for each designated time step (i.e., at a designated control period). Reference characters Temxr and Temnr in formula (9) respectively correspond to the upper and lower limit constraint values on an attainable torque (or reachable torque) that is the engine torque Te (i.e., the manipulated variable of the second torque device) that can be attained in the next time step. More specifically, the engine torque range that can be attained at the next time step when the engine torque Te is instructed at a certain time step is identified by the upper and lower limit constraint values Temxr and Temnr. It should be noted that the attainable torque corresponds to an example of the "attainable manipulated variable" according to the present disclosure.

A reference character Temx in formula (10) corresponds to an upper limit constraint value of the engine torque Te, and an example of a lower limit constraint value thereof is zero. Temx and zero in formula (10) respectively correspond to upper and lower limit values of the engine torque Te for guaranteeing the operation of the internal combustion engine 20 (i.e., for preventing the failure thereof). In addition, the lower limit value in formula (10) may be any negative value instead of zero. Reference characters Tgmn and Tgmx in formula (11) correspond to a lower limit constraint value and an upper limit constraint value of the MG1 torque Tg, respectively. Reference characters Tmmn and Tmmx in formula (12) correspond to a lower limit constraint value and an upper limit constraint value of the MG2 torque Tm, respectively. Also, these Tgmn, Tgmx, Tmmn and Tmmx respectively correspond to upper and lower limit values of the MG1 torque Tg and MG2 torque Tm for guaranteeing the operation of the MG 1 and MG 2 (i.e., for preventing the failure thereof). Each of formulas (9)-(12) described above indicates a range of the constraints of the respective manipulated variables (Te, Tg and Tm). In addition, formula (13) indicates that shortage amounts $y_i^-$ and excess amounts $y_i^+$ of the individual state quantities with respect to the associated target values are not negative values.

The problem (linear programming problem F) that finds the manipulated variables that achieve the target state quantities (Tp, Pchg and dNg) to the maximum possible in accordance with the priorities $P_1$-$P_3$ within the constraints can be organized and represented using the objective function f1 shown in formula (2) and the constraints shown in formulas (3)-(13), as described above.

(Manipulated Variable Upper and Lower Limit Calculation Section)

The manipulated variable upper and lower limit calculation section 62 shown in FIG. 2 calculates, as the upper limit constraint value Temxr and the lower limit constraint value Temnr, the maximum and minimum values of the attainable torque of the internal combustion engine 20 represented by formula (9). More specifically, in the processing of step S104 described below, the manipulated variable upper and lower limit calculation section 62 calculates the upper limit constraint value Temxr and the lower limit constraint value Temnr based on the engine speed Ne and the estimated torque Teest at the current time step. It should be noted that, in the present embodiment, the engine speed Ne and the estimated torque Teest correspond to an example of "the rotational speed and the estimated manipulated variable of the second torque device" according to the present disclosure.

(Example of Equivalence Transformation to Linear Programming Problem in Equation Standard Form)

Formulas (14)-(31) described below are obtained by adding new variables $x_2'$, $x_2''$, $x_3'$, $x_3''$ and $x_i$ (i=4 to 16) to the respective formulas (3)-(12) of the constraints to modify them. According to Formulas (14)-(31), the constraints (formulas (3)-(12)) can be represented only using equality constraints (formulas (14)-(29)) and non-negative constraints of the variables (formulas (30) and (31)). It should be noted that the variable $x_2$ already described is equal to the difference ($x_2'-x_2''$) between the variable $x_2'$ and the variable $x_2''$, and similarly, the variable $x_3$ is equal to the difference ($x_3'-x_3''$) between the variable $x_3'$ and the variable $x_3''$.

$$c_{11}x_1+c_{12}(x_2'+x_2'')+c_{13}(x_3'-x_3'')+y_1^--y_1^+=g_1 \quad (14)$$

$$c_{21}x_1+c_{22}(x_2'+x_2'')+c_{23}(x_3'-x_3'')+y_2^--y_2^+=g_1 \quad (15)$$

$$c_{31}x_1+c_{32}(x_2'+x_2'')+c_{33}(x_3'-x_3'')+y_3^--y_3^+=g_1 \quad (16)$$

$$c_{11}x_1+c_{12}(x_2'+x_2'')+c_{13}(x_3'-x_3'')-x_4=Tpmn \quad (17)$$

$$c_{11}x_1+c_{12}(x_2'+x_2'')+c_{13}(x_3'-x_3'')+x_5=Tpmx \quad (18)$$

$$c_{21}x_1+c_{12}(x_2'+x_2'')+c_{13}(x_3'-x_3'')-x_6=Win \quad (19)$$

$$c_{21}x_1+c_{22}(x_2'+x_2'')+c_{23}(x_3'-x_3'')+x_7=Wout \quad (20)$$

$$c_{31}x_1+c_{32}(x_2'+x_2'')+c_{33}(x_3'-x_3'')-x_8=dNgmn \quad (21)$$

$$c_{31}x_1+c_{32}(x_2'+x_2'')+c_{33}(x_3'-x_3'')+x_9=dNgmx \quad (22)$$

$$x_1-x_{10}=Temnr \quad (23)$$

$$x_1+x_{11}=Temxr \quad (24)$$

$$x_1+x_{12}=Temx \quad (25)$$

$$x_2'-x_2''+x_{13}=Tgmn \quad (26)$$

$$x_2'-x_2''+x_{14}=Tgmx \quad (27)$$

$$x_3'-x_3''-x_{15}=Tmmn \quad (28)$$

$$x_3'-x_3''+x_{16}=Tmmx \quad (29)$$

$$x_i \geq 0 \quad (30)$$

$i=1,4,5,\ldots,16$ $$x_2', x_2'', x_3', x_3'' \geq 0 \tag{31}$$

$$y_i^-, y_i^+ \geq 0 (i=1,2,3) \tag{13}$$

As a result of the formulas being modified as just described, the linear programming problem F described above can be formulated in the equation standard form (that is, in a form that the objective function (evaluation function) is a linear function and that the constraints only include equation constraints and non-negative constraints). The linear programming problem F formulated in this way can be solved by the use of, for example, a simplex method as described below with reference to FIG. 4. It should be noted that any other known solution method (for example, internal point method) may be used as a solution method of the linear programming problem F.

1-2-2. Processing by Control Device

Figure 4:
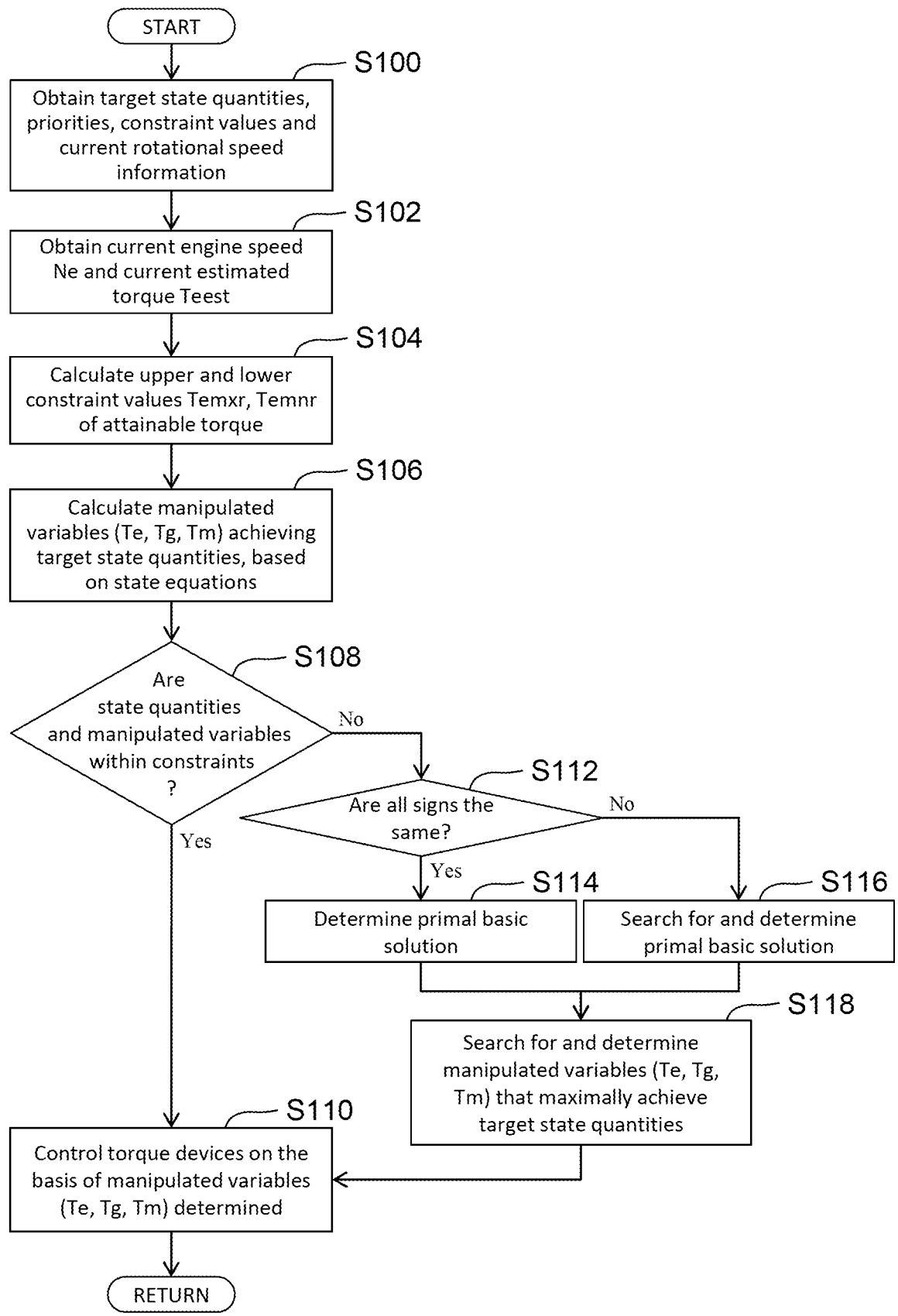
FIG. 4 is a flowchart that illustrates a routine of processing relating to the torque device control according to the first embodiment of the present disclosure.

FIG. 4 is a flowchart that illustrates a routine of the processing relating to the torque device control according to the first embodiment of the present disclosure. The present routine is repeatedly executed at a designated control interval during the operation of the powertrain system 10. To be more specific, the "manipulated variable determination section 58" according to the present embodiment executes the processing of steps S100, S106, S108, and S112 to S118 described below, and the "torque device control section 60" executes the processing of step S110. In addition, the "manipulated variable upper and lower limit calculation section 62" executes the processing of steps S102 and S104.

According to the routine shown in FIG. 4, first, in step S100, the control device 50 obtains the target state quantities ($g_1$-$g_3$), the priorities $P_1$-$P_3$ of the target state quantities (in this routine, priority order), the individual constraints of the state quantities and manipulated variables (for example, Tpmn in formulas (6) to (12)) and the current rotational speed information (see FIG. 2). In more detail, the operational state of the vehicle changes in accordance with a request from the driver of the vehicle. If, for example, the operational state changes, the target state quantities and the constraints also change. Because of this, according to step S100, the target state quantities and the constraints that both depend on the operational state of the vehicle are obtained on the basis of the information from the various sensors connected to the control device 50 and predetermined maps. Thereafter, the processing proceeds to step S102.

In step S102, the control device 50 obtains (calculates) the current (i.e., current time step) engine speed Ne and the estimated torque Teest by, for example, the method described above. Thereafter, the processing proceeds to step S104.

Figure 5A:
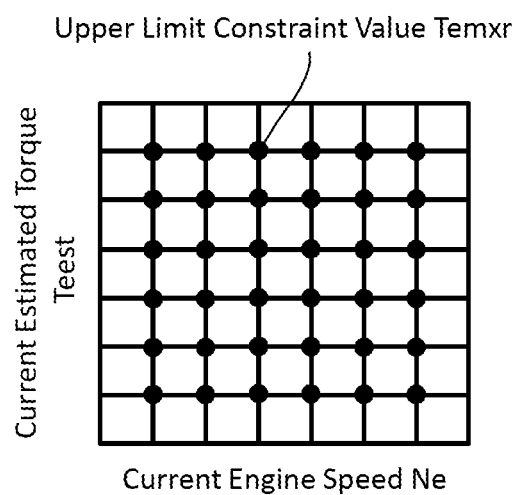
FIG. 5A shows a map that defines a relationship between the current engine speed Ne and estimated torque Teest, and an upper limit constraint value Temxr.
Figure 5B:
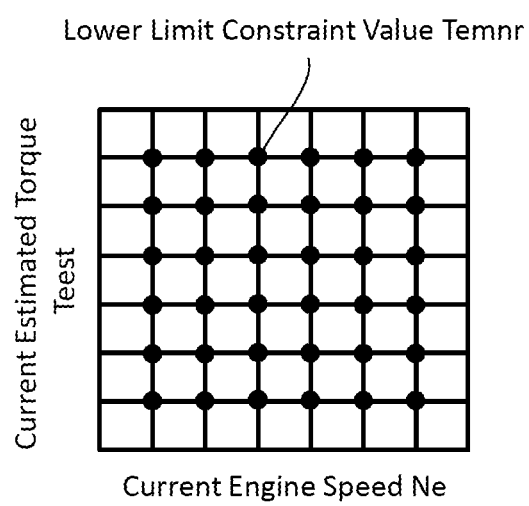
FIG. 5B shows a map that defines a relationship between the current engine speed Ne and estimated torque Teest, and a lower limit constraint value Temnr.

In step S104, the control device 50 calculates, as the upper limit constraint value Temxr and the lower limit constraint value Temnr, the maximum and minimum values of the engine torque Te that is attainable at the next time step. FIG. 5A shows a map that defines the relationship between the current engine speed Ne and estimated torque Teest, and the upper limit constraint value Temxr, and FIG. 5B shows a map that defines the relationship between the current engine speed Ne and estimated torque Teest, and the lower limit constraint value Temnr. The control device 50 stores these maps. In this step S104, the control device 50 calculates the upper limit constraint value Temxr and the lower limit constraint value Temnr from these maps, based on the current engine speed Ne and the estimated torque Teest.

The relationships of the maps shown in FIGS. 5A and 5B can be set based on the results of experiments conducted in advance. Also, the relationships of the maps may alternatively be determined by using the results of machine learning performed in advance by any method. It should be noted that, instead of the maps, the relational information provided in the control device 50 for calculating the upper limit constraint value Temxr may be, for example, a relational formula that defines the relationship between the current engine speed Ne and estimated torque Teest, and the upper limit constraint value Temxr. This also applies to the lower limit constraint value Temnr.

Following step S104, the processing proceeds to step S106. In step S106, the control device 50 substitutes the target state quantities obtained in step S100 into simultaneous equations expressed by formula (1) and solves the simultaneous equations to calculate the manipulated variables (Te, Tg and Tm) that achieve the target state quantities (in other words, the manipulated variables associated with the target state quantities). This kind of calculation of the manipulated variables (Te, Tg and Tm) also corresponds to an example of determination of the manipulated variables that achieve the target state quantities to the maximum extent possible. Thereafter, the processing proceeds to step S108.

In step S108, the control device 50 determines whether or not the individual target state quantities obtained in step S100 and the individual manipulated variables calculated in step S106 are located within the constraints (i.e., in the ranges satisfying the individual constraint values, which are obtained in steps S100 and S106). In more detail, according to this step S108, it is determined using a mathematical way whether or not the simultaneous equations described above have a single solution and this solution is located within the range of the constraint values.

If the determination result of step S108 is positive, the processing proceeds to step S110. In step S110, the control device 50 controls the individual torque devices (the internal combustion engine 20, the MG 1 and the MG 2) in accordance with the manipulated variables calculated (determined) in step S106. Thereafter, the current processing cycle is ended.

If, on the other hand, the determination result of step S108 is negative, the control device 50 executes the processing of steps S112 to S118 in order to search for and determine manipulated variables (that is, the optimal solution of the manipulated variables) that achieves the target state quantities to the maximum extent possible within the constraints. In detail, first, the processing proceeds to step S112 in order to obtain a primal basic solution of the linear programming problem F according to the present routine.

In step S112, the control device 50 determines whether the sign of each of the upper and lower limit constraint values of the state quantities and manipulated variables (Tpmn, Tpmx, Win, Wout, dNgmn, dNgmx, Temxr, Temnr, Temx, Tgmn, Tgmx, Tmmn and Tmmx) and the sign of the corresponding one of coefficients of slack variables $x_4$-$x_{16}$ (see formulas (17)-(29)) are all the same or not. In addition, if a constraint value (for example, Tpmn) associated with any one of the slack variables $x_4$-$x_{16}$ is zero, the sign of this constraint value becomes zero. However, in step S112, the sign of the constraint value is determined to be the same as the sign of the corresponding one of the slack variables $x_4$-$x_{16}$.

If the determination result of step S112 is positive, the processing proceeds to step S114. In step S114, the control device 50 sets a primal basic solution of the variables $x_1$, $x_2'$, $x_2''$, $x_3'$, $x_3''$, $y_i^-$ and $y_i^+$ (i=1-3) and slack variables $x_4$-$x_{16}$ using a manner described below.

That is, as shown in formulas (32)-(34) described below, the variables $x_1$, $x_2'$, $x_2''$, $x_3'$ and $x_3''$ are made zero. The values of $y_i^-$ and $y_i^+$ (i=1-3) are changed in accordance with the signs of the corresponding target values (i.e., the values of the target state quantities) $g_1$, $g_2$ and $g_3$ of the state quantities. In detail, when the target value $g_1$ is equal to or greater than zero, the variable is made equal to the target value $g_1$ and the variable $y_1^+$ is made zero. When, on the other hand, the target value $g_1$ is negative, the variable $y_1^-$ is made zero and the variable $y_1^+$ is made equal to the target value $g_1$. This also applies to the relationships between the other variables $y_2^-$, $y_2^+$, $y_3^-$ and $y_3^+$ and the target values $g_2$ and $g_3$. In addition, the slack variable $x_4$ is made equal to $-Tpmn$, and, when $Tpmn$ is zero, the slack variable $x_4$ is made zero. This also applies to the other slack variables $x_5$-$x_{16}$. The primal basic solution can be set in this way due to the following reason. That is, if the signs of the individual constraint values and the signs of the coefficients of the slack variables are all the same, it can be found that the combination of values of the variables (such as, $x_1$) that are set as the primal basic solution in this step S114 is associated with one of peaks of the convex polyhedron (e.g., see FIG. 6 described below) generated by the constraint formulas represented by formulas (13)-(31).

$$\begin{bmatrix} x1 \\ x2' \\ x2'' \\ x3' \\ x3'' \\ y_1^- \\ -y_1^+ \\ y_2^- \\ -y_2^+ \\ y_3^- \\ -y_3^+ \\ -x4 \\ x5 \\ -x6 \\ x7 \\ -x8 \\ x9 \\ -x10 \\ x11 \\ x12 \\ -x13 \\ x14 \\ -x15 \\ x16 \end{bmatrix} = \begin{bmatrix} 0 \\ 0 \\ 0 \\ 0 \\ 0 \\ \square \\ \square \\ \square \\ \square \\ \square \\ \square \\ Tpmn \\ Tpmx \\ Win \\ Wout \\ dNgmn \\ dNgmx \\ Temnr \\ Temxr \\ Temx \\ Tgmn \\ Tgmx \\ Tmmn \\ Tmmx \end{bmatrix} \quad (32)$$

Where $g_1 \geq 0$ $$\begin{bmatrix} y_1^- \\ -y_1^+ \end{bmatrix} = \begin{bmatrix} g_1 \\ 0 \end{bmatrix} \quad (33)$$

Where $g_1 < 0$ $$\begin{bmatrix} y_1^- \\ -y_1^+ \end{bmatrix} = \begin{bmatrix} 0 \\ g_1 \end{bmatrix} \quad (34)$$

The same applies to $g_2$ and $g_3$.

If, on the other hand, the determination result of step S112 is negative, that is, if the signs are not the same in all combinations of the constraint values and the corresponding coefficients of the slack variables, the processing proceeds to step S116. In step S116, in order to obtain a primal basic solution of the variables $x_1$, $x_2'$, $x_2''$, $x_3'$, $x_3''$, and $y_i^-$ and $y_i^+$ (i=1-3) and slack variables $x_4$-$x_{16}$, the control device 50 executes the processing to solve another linear programming problem that minimizes an objective function (evaluation function) z represented by formula (35) while satisfying constraints shown below. Hereunder, for ease of explanation, the linear programming problem for obtaining the primal basic solution in this way is referred to as the "linear programming problem Z".

Minimization: $z = \Sigma_{j=1}^{14} t_j$ \quad (35)

Constraints:

$t_1 = g_1 - \{c_{11}x_1 + c_{12}(x_2' - x_2'') + c_{13}(x_3' - x_3'') + y_1^- - y_1^+\}$ $t_2 = g_2 - \{c_{21}x_1 + c_{22}(x_2' - x_2'') + c_{23}(x_3' - x_3'') + y_2^- - y_2^+\}$ $t_3 = g_3 - \{c_{31}x_1 + c_{32}(x_2' - x_2'') + c_{33}(x_3' - x_3'') + y_3^- - y_3^+\}$ $t_4 = Tpmn - \{c_{11}x_1 + c_{12}(x_2' - x_2'') + c_{13}(x_3' - x_3'') - x_4\}$ $t_5 = Tpmx - \{c_{11}x_1 + c_{12}(x_2' - x_2'') + c_{13}(x_3' - x_3'') + x_5\}$ $t_6 = Win - \{c_{21}x_1 + c_{22}(x_2' - x_2'') + c_{23}(x_3' - x_3'') - x_6\}$ $t_7 = Wout - \{c_{21}x_1 + c_{22}(x_2' - x_2'') + c_{23}(x_3' - x_3'') + x_7\}$ $t_8 = dNgmn - \{c_{31}x_1 + c_{32}(x_2' - x_2'') + c_{33}(x_3' - x_3'') - x_8\}$ $t_9 = dNgmx - \{c_{31}x_1 + c_{32}(x_2' - x_2'') + c_{33}(x_3' - x_3'') + x_9\}$ $t_{10} = Temnr - \{x_1 - x_{10}\}$ $t_{11} = Temxr - \{x_1 + x_{11}\}$ $t_{12} = Temx - \{x_1 + x_{12}\}$ $t_{13} = Tgmn - \{x_2' - x_2'' - x_{13}\}$ $t_{14} = Tgmx - \{x_2' - x_2'' + x_{14}\}$ $t_{15} = Tmmn - \{x_3' - x_3'' - x_{15}\}$ $t_{16} = Tmmx - \{x_3' - x_3'' + x_{16}\}$ $x_i \geq 0$ i=1,4,5,...,16

$x_2', x_2'', x_3', x_3'' \geq 0$ $y_i^-, y_i^+ \geq 0$ i=1,2,3

$t_i \geq 0$ i=1,2,...,16

To be more specific, reference characters $t_i$ (i=1 to 16) are artificial variables introduced to search for the primal basic solution (feasible solution). According to the constraints described above, by moving the left-hand side of formulas (14)-(29) to the right-hand side thereof, the artificial variables $t_i$ are each represented as values equal to values on the right-hand side obtained as a result. In step S116, in order to solve this linear programming problem Z, the control device 50 searches for and determines the values of the variables $x_1$, $x_2'$, $x_2''$, $x_3'$, $x_3''$, $y_i^-$ and $y_i^+$ (i=1 to 3) and slack variables $x_4$-$x_{16}$ (that is, the primal basic solution) that make the objective function z zero using, for example, a simplex method (that is, that make all the artificial variables $t_i$ zero). It should be noted that, if the objective function z does not become zero (that is, if all of the artificial variables $t_i$ do not become zero), there is no feasible solution that satisfies the constraints. According to the powertrain system 10, the individual constraint values are determined such that a situation that there is no feasible solution as just described does not occur.

After the primal basic solution is obtained by the processing of step S114 or S116, the processing proceeds to step S118. In step S118, the control device 50 searches for and determines the manipulated variables (Te, Tg and Tm) that maximally achieves the target state quantities (Tp, Pchg and dNg) in accordance with the priorities $P_1$-$P_3$ within the constraints (see formulas (13)-(31)), that is, the control device 50 searches for and determines the optimal solution of the manipulated variables. In detail, the control device 50 uses the primal basic solution obtained by the processing of step S114 or S116 to execute the processing for solving the above-described linear programming problem F organized using the objective function f1 in formula (2) and the constraints (see formulas (13)-(31)).

Figure 6:
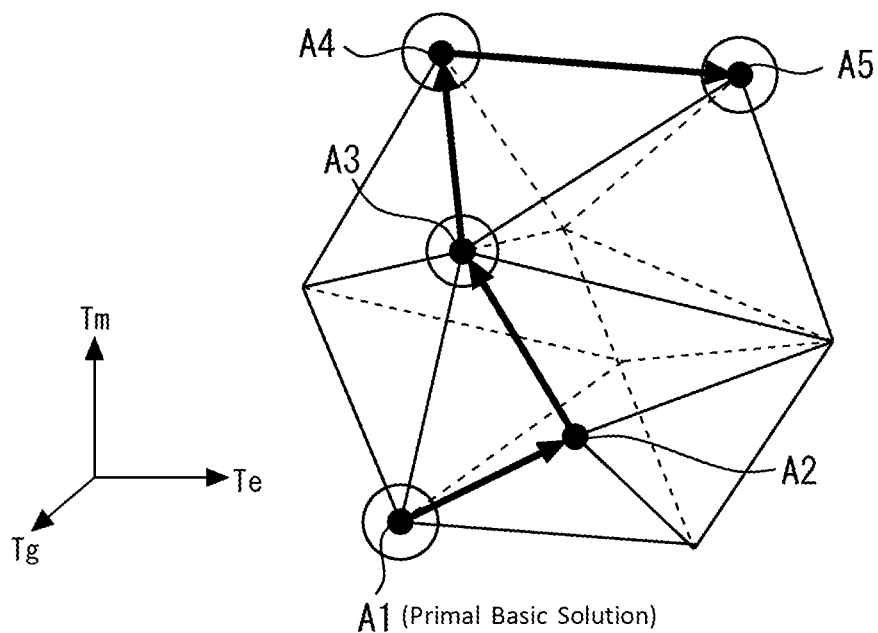
FIG. 6 is a conceptual diagram used to describe an outline of an algorithm for searching for an optimal solution of manipulated variables with priorities $P_1$-$P_3$ taken into consideration.

FIG. 6 is a conceptual diagram used to describe the outline of the algorithm for searching for the optimal solution of the manipulated variables with the priorities $P_1$-$P_3$ taken into consideration. FIG. 6 represents an example of using the simplex method. In the example of the linear programming problem F according to the present embodiment in which three manipulated variables are used, the region in which the constraints are satisfied are three-dimensionally represented by a convex polyhedron as shown in FIG. 6. In more detail, in the region (space) inside this kind of convex polyhedron, all the constraints are satisfied.

The optimal solution of the manipulated variables is obtained at any one of the vertexes of the convex polyhedron. According to the present algorithm using the simplex method as an example, the optimal solution is searched while following the vertexes of the convex polyhedron. Moreover, according to the present embodiment, as a detailed example of the priorities $P_1$-$P_3$, the priority order is used as described above. The search for the optimal solution with the priority order taken into consideration is performed in the following procedure.

A vertex A1 in FIG. 6 is associated with the primal basic solution. The search for the optimal solution is started from this vertex A1. The target state quantity that is the highest in the priority order in the example according to the present embodiment is the target value $g_1$ of the driving torque Tp. Because of this, first, a vertex A2 is searched for to reduce the amount of deviation $(y_1^- + y_1^+)$ of the driving torque Tp from the target value $g_1$ as compared to the vertex A1. This search is continued until a vertex at which the amount of deviation $(y_1^- + y_1^+)$ can be no longer reduced is obtained even when moving from a vertex in any direction. In FIG. 6, a vertex A3 corresponds to an example of this kind of vertex. It should be noted that, where there are a plurality of vertexes that can reduce the amount of deviation $(y_1^- + y_1^+)$ in the course of this kind of search, it is sufficient to ensure that the search is completed in a finite number of times by selecting a destination vertex using the smallest subscript rule (Bland's rule).

According to the present algorithm, then, a vertex A4 at which the amount of deviation $(y_3^- + y_3^+)$ from the target value $g_3$ of the rotational speed change rate dNg that is the target state quantity having the second highest order of priority can be reduced is searched while the amount of deviation $(y_1^- + y_1^+)$ of the driving torque Tp that is the highest in priority order is not increased. This search is also continued until a vertex at which the amount of deviation $(y_3^- + y_3^+)$ can be no longer reduced is obtained even when moving from a vertex in any direction. In FIG. 6, the vertex A4 corresponds to an example of this kind of vertex.

After the vertex A4 is obtained, similarly, the search for a vertex is performed to reduce the amount of deviation $(y_2^- + y_2^+)$ from the target value $g_2$ of the charge/discharge amount Pchg that is the target state quantity and the lowest in priority order while neither the amount of deviation $(y_1^- + y_1^+)$ of the driving torque Tp nor the amount of deviation $(y_3^- + y_3^+)$ of the rotational speed change rate dNg is increased. According to the example shown in FIG. 6, a vertex A5 corresponds to a vertex at which the amount of deviation $(y_2^- + y_2^+)$ can be minimized while not increasing both the amounts of deviation $(y_1^- + y_1^+)$ and $(y_3^- + y_3^+)$.

According to the present algorithm, the value of the manipulated variable at the vertex A5 described above is determined as the optimal solution. According to the manipulated variable determination section 58 of the present embodiment that uses this kind of algorithm, the manipulated variables of the torque devices that maximally achieve the target state quantities in the order from the highest one in priority order within the constraints can be determined by solving the linear programming problem F.

The processing according to the present routine proceeds to step S110 after step S118. As a result, the torque devices are controlled in accordance with the manipulated variables (Te, Tg and Tm; optimal solution) determined by the processing of step S118.

1-3. Effect

According to the torque device control of the present embodiment described so far, the processing is performed by the manipulated variable determination section 58 to determine the optimal manipulated variables by solving the above-described linear programming problem F on the basis of the linear state equations that define the relationships between the controlled state quantities (i.e., control variables) and the manipulated variables of the torque devices. As a result, the manipulated variables of the torque devices are determined so as to achieve the target state quantities to the maximum extent possible while satisfying the constraints, and the torque devices can be controlled in accordance with the determined manipulated variables.

Then, according to the torque device control of the present embodiment, the relationships between the state quantities (control variables) and the manipulated variables in the driveline of the powertrain system 10 are expressed by the linear state equations. The state equations of the driveline of a powertrain system is linear without depending on the system configuration. Therefore, a highly versatile control structure (i.e., control platform) that can be easily applied to another powertrain system provided with any first and second torque devices can be built by appropriately changing the type and number of the state quantity and manipulated variable that are substituted into the state equations. In other words, a torque device control that can be applied to powertrain systems having other configurations (for example, see third to seventh embodiments described below) can be achieved without changing the control structure.

Moreover, among the plurality of torque devices included in the powertrain system 10 according to the present embodiment, the response delay of the output of the internal combustion engine 20 (i.e., second torque device) is larger than that of the MG 1 and the MG 2 (i.e., first torque devices). Here, in determining the optimal manipulated variable of each torque device using the linear programming method, the response delay of the output of the torque device is not taken into consideration unless special consideration is given. However, in the powertrain system including the first torque device and the second torque device having a difference in responsiveness in this way, in order to optimize the manipulated variables of all torque devices at the same time, it is favorable that the optimal manipulated variable of each torque device can be determined while considering the response delay of the second torque device. Also, it is favorable that this kind of determination of the optimal manipulated variable can be achieved while reducing an increase in the amount of calculation (calculation load) of the control device.

In view of the issue described above, according to the torque device control of the present embodiment, the constraints of the powertrain system 10 include the upper limit constraint value Temxr and the lower limit constraint value Temnr regarding the attainable engine torque Te calculated based on the engine speed Ne and the estimated torque Teest at the current time step. According to this kind of method, the manipulated variable determination section 58 can optimize all the manipulated variables (Te, Tg, Tm) while selecting the manipulated variable (Te) within the engine torque range (i.e., the range from the lower limit constraint value Temnr to the upper limit constraint value Temxr) that is attainable at the next time step. That is, it is possible to optimize all the manipulated variables only by once searching for the optimum manipulated variable while considering the response delay of the internal combustion engine 20.

As described so far, according to the torque device control of the present embodiment, even if a torque device (such as the internal combustion engine 20) whose response delay is larger than another torque device is included, the linear programming method can be used such that proper manipulated variables of all the torque devices can be determined while reducing an increase in the amount of calculation (calculation load) for optimizing all the manipulated variables.

Moreover, in an example of using a plurality of target state quantities as in the torque device control according to the present embodiment, it is favorable to be able to determine optimal manipulated variables with differences in the priority among the plurality of target state quantities also taken into consideration. In this regard, according to the manipulated variable determination section 58 of the present embodiment, the manipulated variables that maximally achieve the plurality of target state quantities in the order from one having the highest priority order is determined by solving the linear programming problem F within the constraints. Because of this, by the use of the manipulated variable determination section 58, the manipulated variables according to the priority of the target state quantities can be determined without changing the control structure. Furthermore, according to the manipulated variable determination section 58, the level of the priority (priority order) is appropriately changed between the plurality of the target state quantities, whereby the individual manipulated variables can be determined such that any target state quantities are achieved to the maximum extent possible. In addition, according to the present embodiment in which the relationships between the control variables (state quantities) and the manipulated variables are expressed by the linear state equations, the effects of the individual manipulated variables with respect to the corresponding control variables are multiaxially treated.

Figure 7:
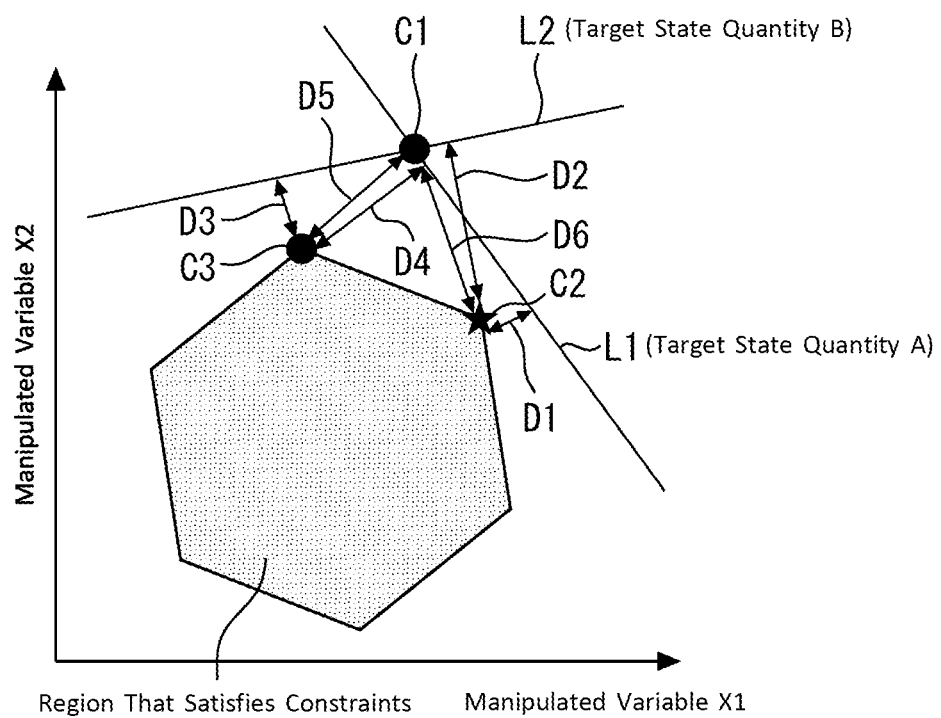
FIG. 7 is a conceptual diagram used to describe the difference of manners of determining the manipulated variables depending on whether or not the priority order (priority) is set.

With regard to the determination of the manipulated variables with the priority order taken into consideration, a supplemental description is made below. FIG. 7 is a conceptual diagram used to describe the difference of manners of determining the manipulated variables depending on whether or not the priority order is set. In FIG. 7, for ease of description, an example of having two target state quantities A and B and two manipulated variables X1 and X2 is used.

In the example of two manipulated variables, the region that satisfies the constraints is represented by a polygon as shown in FIG. 7. A straight line L1 in FIG. 7 corresponds to a straight line (i.e., state equation) that satisfies the target state quantity A, and a straight line L2 corresponds to a straight line (i.e., state equation) that satisfies the target state quantity B. Thus, an intersection point C1 of these straight lines L1 and L2 corresponds to a point that satisfies both the target state quantities A and B.

As shown in FIG. 7, the intersection point C1 is located outside the region that satisfies the constraints. A vertex C2 corresponds to a vertex at which the amount of deviation from the target state quantity A (i.e., straight line L1) is the smallest among the vertexes of the polygon shown in FIG. 7. Also, at the vertex C2, the amount of deviation D1 from the target state quantity A (i.e., distance D1 from the straight line L1) is smaller than the amount of deviation D2 from the target state quantity B. In contrast to the vertex D2, at another vertex C3, the amount of deviation D3 from the target state quantity B is smaller than the amount of deviation D4 from the target state quantity A. In addition, regarding the distance with respect to the intersection point C1, a distance D5 from the vertex C3 is shorter than a distance D6 from the vertex C2.

In an example in which the priority order of the target state quantity A is made higher than the priority order of the target state quantity B under the constraints shown in FIG. 7, when the processing by the manipulated variable determination section 58 is performed using the simplex method as an example, the results are as follows. That is, the values of the manipulated variables X1 and X2 at the vertex C2 is determined as the optimal solution. This is because, although regarding the distance with respect to the intersection point C1, the distance D6 at the vertex C2 is longer than the distance D5 at the vertex C3, regarding the distance with respect to the straight line L1 of the target state quantity A that is the highest in priority order, the distance D1 at the vertex C2 becomes shorter than any of distances from the other five vertexes (including the vertex C3) to the straight line L1. If, on the other hand, the search is performed using, for example, the simplex method without the priority order taken into consideration, it is considered that the values of the manipulated variables X1 and X2 at the vertex C3 at which the distance with respect to the intersection point C1 is relatively short are determined as the optimal solution.

Furthermore, in an example in which the priority order of the target state quantity B is relatively high contrary to the example described above, the vertex C3 can be selected in order to determine the optimal solution without depending on whether the priority order is used or not.

As can be seen from the above description, according to the manipulated variable determination section 58 of the present embodiment that can search for the optimal solution with the priority order also taken into consideration, the manipulated variables that achieve the target state quantities to the maximum extent possible in the order from one having the highest priority order can be surely selected without depending on positional relationships between the vertexes of the constraints and the straight lines satisfying the target state quantities.

1-4. Another Specific Example of Using Priority

According to the first embodiment described above, the priority order is taken as one of specific examples of using the priorities $P_1$-$P_3$. However, the "priority" according to the present disclosure may be given as weight, instead of the example of the priority order. This also applies to other second to ninth embodiments.

In detail, in the example of the weight, the values of the priorities $P_1$-$P_3$ are made greater when the priority is higher. As a result, a higher priority term has a greater influence on the value of the objective function f1 than a lower priority term. In more detail, in the example of the weight, the value of the priority $P_1$ to $P_3$ may be properly determined such that the manipulated variables that are achieved to the maximum extent possible in the order from the target state quantity that is the highest in priority by solving the linear programming problem F.

2. Second Embodiment

Then, a second embodiment according to the present disclosure will be described with reference to FIGS. 8 to 10.

2-1. Example of Configuration of Powertrain System

Figure 8:
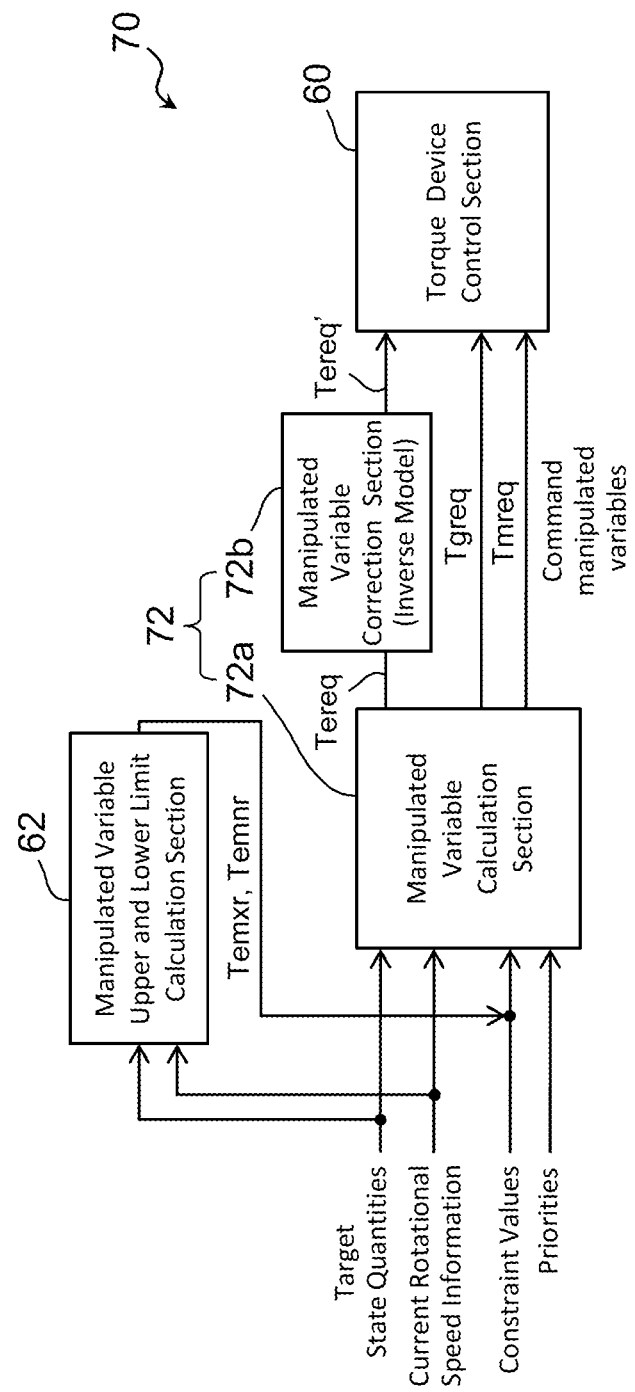
FIG. 8 is a block diagram that illustrates a functional configuration of a control device 70 related to a torque device control according to a second embodiment of the present disclosure.

A powertrain system according to the second embodiment is similar to the powertrain system 10 according to the first embodiment except that a control device 70 shown in FIG. 8 is included instead of the control device 50.

2-2. Torque Device Control According to Second Embodiment

FIG. 8 is a block diagram that illustrates a functional configuration of the control device 70 related to a torque device control according to the second embodiment of the present disclosure. The control device 70 is different from the control device 50 according to the first embodiment in the following points. That is, in order to perform the torque device control, the control device 70 includes a "manipulated variable determination section 72" in addition to the "torque device control section 60" and the "manipulated variable upper and lower limit calculation section 62". The manipulated variable determination section 72 includes a manipulated variable calculation section 72a having the same function as the manipulated variable determination section 58 shown in FIG. 2, and a manipulated variable correction section 72b.

Figure 9:
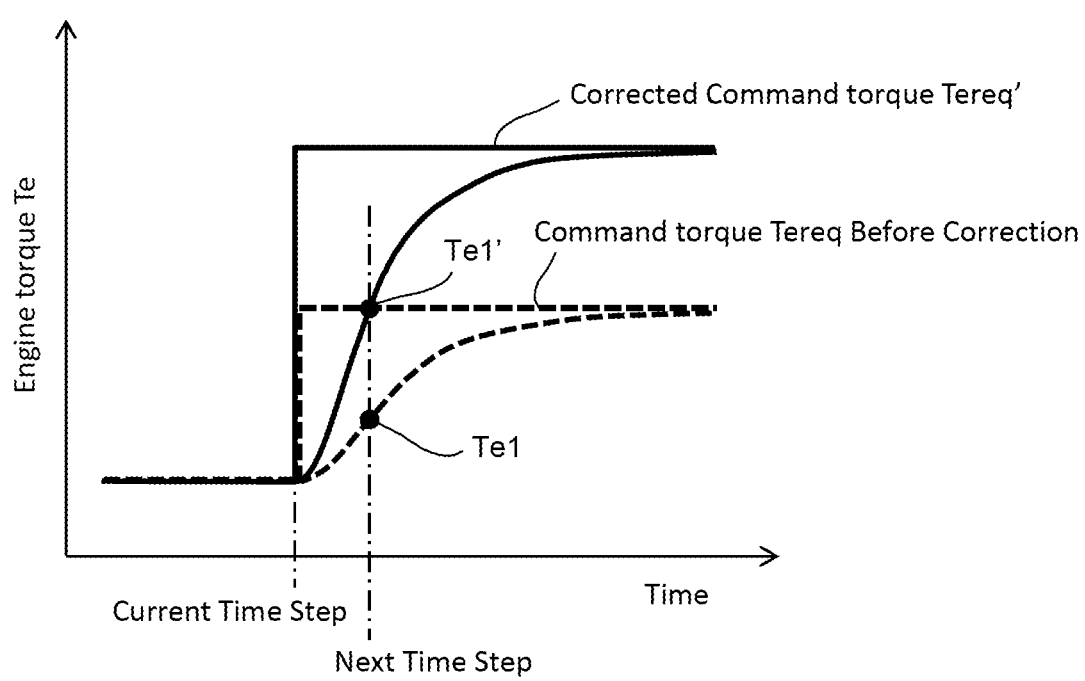
FIG. 9 is a graph used to describe an outline of a manipulated variable correction section shown in FIG. 8.

FIG. 9 is a graph used to describe the outline of the manipulated variable correction section 72b. For convenience of explanation, the manipulated variable (Te) of the internal combustion engine 20 determined by the processing of step S106 or S118 of the routine shown in FIG. 4 described above is referred to as a "command torque Tereq before correction". This corrected torque Tereq before correction corresponds to an example of "the determined value of the second manipulated variable determined by solving the linear programming problem" according to the present disclosure.

As already described with reference to FIG. 3, there is a response delay in the output of the internal combustion engine 20. Because of this, when the manipulated variable determination section 72 instructs the command torque Tereq to the torque device control section 60 at the current time step, the command torque Tereq may not be achieved at the next time step as in the example of an engine torque Te1 shown in FIG. 9. In this regard, FIG. 9 further illustrates an engine torque Te1' equal to the command torque Tereq, and a corrected command torque Tereq' which achieves this engine torque Te1' at the next time step. From FIG. 9, it can be seen that, if the command torque Tereq can be corrected as the corrected command torque Tereq' and then instructed to the torque device control section 60, the command torque Tereq before correction (=Te1') can be achieved at the next time step.

In view of the issue described above, the manipulated variable correction section 72b corrects the command torque Tereq in accordance with the inverse characteristic of the response delay characteristic of the internal combustion engine 20 to calculate the corrected command torque Tereq' in which the command torque tereq (before correction) is achieved at the next time step. Then, the manipulated variable determination section 72 outputs the corrected command torque Tereq', which has been calculated, to the torque device control section 60. It should be noted that an example of increasing the manipulated variable (i.e., the engine torque Te) of the internal combustion engine 20 has been described here with reference to FIG. 9, but the same can be said for an example of decreasing the engine torque Te. In addition, the corrected command torque Tereq' corresponds to an example of the "corrected second manipulated variable" according to the present disclosure.

2-2-1. Processing by Control Device

Figure 10:
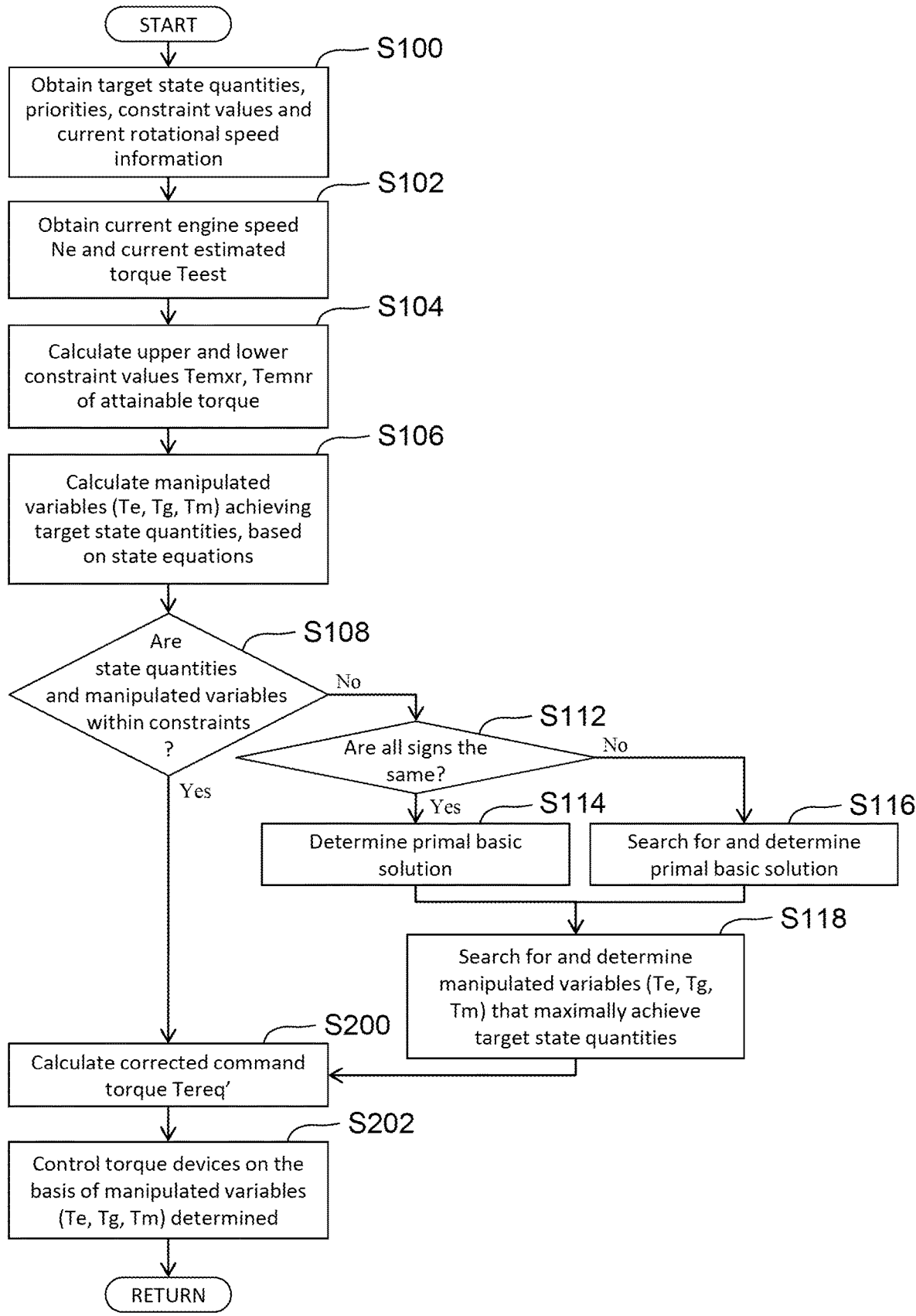
FIG. 10 is a flowchart that illustrates a routine of processing relating to the torque device control according to the second embodiment of the present disclosure.

FIG. 10 is a flowchart that illustrates a routine of the processing relating to the torque device control according to the second embodiment of the present disclosure. It should be noted that the processing of steps S100-S108 and S112-S118 in the routine shown in FIG. 10 is as already described in the first embodiment.

According to the routine shown in FIG. 10, after step S106 or S118, the processing proceeds to step S200. In step S200, the control device 70 (manipulated variable correction section 72b) calculates a corrected command torque Tereq' by correcting the manipulated variable Te (i.e., the command torque Tereq) determined by the processing of step S106 or S118. The calculation of the corrected command torque Tereq' can be performed using, for example, the following method.

The corrected command torque Tereq' corresponds to the engine torque command value output to the torque device control section 60. This command torque Tereq' is calculated using the following formula (36). In formula (36), a reference character Tau is a response time constant of the engine torque Te, and is determined in advance by, for example, experiments as a value reflecting the response delay characteristic of the output (Te) of the internal combustion engine 20. A reference character TS is a designated control period (i.e., the time interval between two time steps). A reference character Tereqsm is an example of the output of the manipulated variable calculation section 72a (i.e., the command torque Tereq), and is, more specifically, the output of the manipulated variable calculation section 72a after a predetermined smoothing process is performed.

$$Tereq' = \frac{\tau au}{\tau s} \cdot Tereqsm + \frac{\tau s - \tau au}{\tau s} \cdot Teest \qquad (36)$$

The Calculation of the corrected command torque Tereq' according to formula (36) corresponds to performing an inverse model calculation of an engine model in which the response delay of the engine torque Te is simulated as the first-order delay. According to formula (36), the corrected command torque Tereq' required to achieve the command torque Tereq at the next time step can be calculated.

The corrected command torque Tereq' calculated in this step S200 is output to the torque device control section 60. It should be noted that the value of the command torque Tereq' output to the torque device control section 60 is limited so as not to exceed the maximum torque and the minimum torque that the internal combustion engine 20 can generate in the engine operating condition at the current time step. In addition, the maximum torque mentioned here corresponds to the engine torque Te that can be generated when the throttle valve 22 is fully opened under the engine speed Ne at the current time step, and the minimum torque corresponds to the engine torque Te (negative torque) that can be generated when the throttle valve 22 is fully closed and the fuel cut is performed under the engine speed Ne at the current time step.

Following step S200, the processing proceeds to step S202. In step S202, regarding the manipulated variables (Tg and Tm) of the MG 1 and the MG 2, the control device 70 controls the first torque devices (MG 1 and MG 2) in accordance with the manipulated variables determined by the processing of step S106 or S118 in the same manner as the routine shown in FIG. 4 according to the first embodiment. On the other hand, regarding the manipulated variable (Te) of the internal combustion engine 20, the control device 70 controls the second torque device (internal combustion engine 20) in accordance with the corrected command torque Tereq' calculated (determined) by the processing of step S200.

2-3. Effect

As described so far, the manipulated variable determination section 72 according to the present embodiment includes the manipulated variable correction section 72b described above. As a result, as compared with the first embodiment without the manipulated variable correction section 72b, the optimal manipulated variable (i.e., the command torque Tereq) of the second torque device (internal combustion engine 20) determined by the manipulated variable calculation section 72a can be more reliably achieved at the next time step.

3. Third Embodiment

Figure 11:
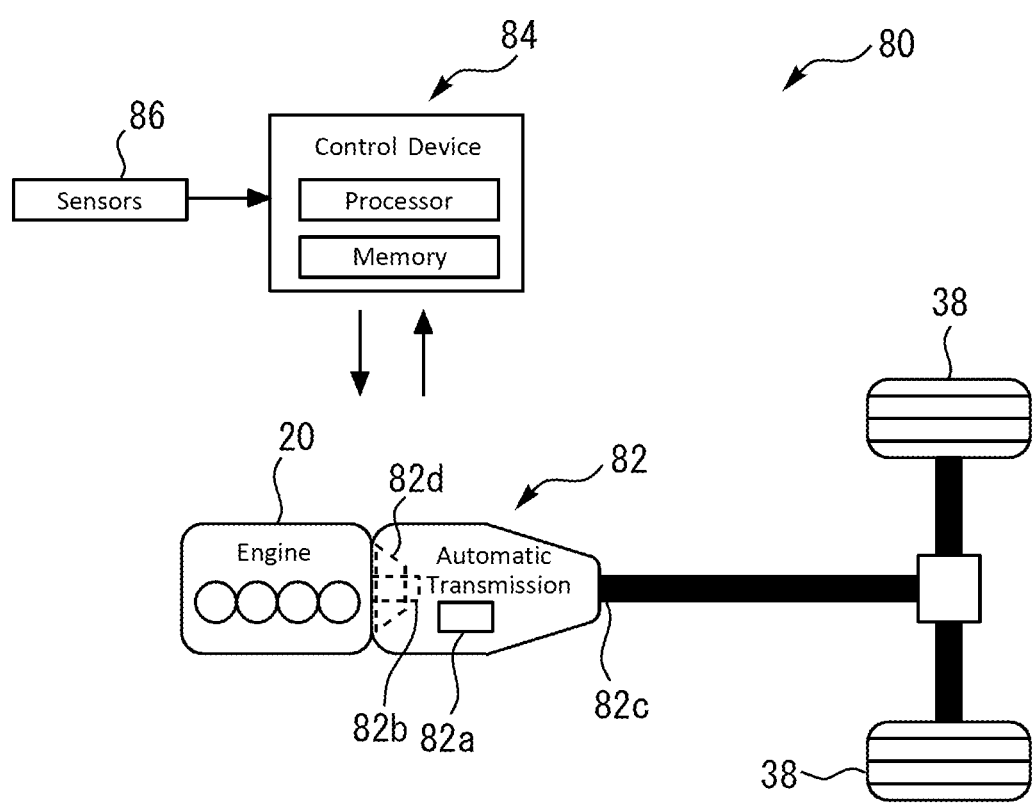
FIG. 11 is a schematic diagram used to describe an example of a configuration of a powertrain system according to a third embodiment of the present disclosure.

Then, a third embodiment according to the present disclosure will be described with reference to FIG. 11. FIG. 11 is a schematic diagram used to describe an example of the configuration of a powertrain system 80 according to the third embodiment of the present disclosure. The powertrain system 80 shown in FIG. 11 includes the internal combustion engine 20 and a stepped automatic transmission 82. The automatic transmission 82 is built in a plurality of hydraulically driven clutches 82a, and is configured so as to control engagement/disengagement of these clutches 82a to switch the gear position. Each clutch 82a has a transmission torque capacity (hereinafter, simply referred to as a "torque capacity") depending on the hydraulic pressure. More specifically, the torque capacity of a clutch which is released during the shifting of the automatic transmission 82 is referred to as Tcr (Nm), and the torque capacity of a clutch which is engaged during the shifting is referred to as Tce (Nm).

The automatic transmission 82 transmits the engine torque Te to the wheels 38 while shifting gears. The automatic transmission 82 "that transmits torque" in this way corresponds to an example of "torque devices associated with control of a driving force of a vehicle" according to the present disclosure, together with the internal combustion engine 20 "that generates torque". Also, in the present embodiment, the internal combustion engine 20 corresponds to a "first torque device" unlike the first and second embodiments. The automatic transmission 82 corresponds to a "second torque device" having a larger output response delay than that of the first torque device (internal combustion engine 20).

The internal combustion engine 20 and the automatic transmission 82 are controlled by a control device 84 having the same configuration as the control device 50 shown in FIG. 2. The control device 84 is electrically connected with sensors 86 including various sensors related to the control of the internal combustion engine 20 and the automatic transmission 82, such as a rotational speed sensor configured to detect a rotational speed Nat of an input shaft (AT input shaft) 82b of the automatic transmission 82. Hereinafter, the difference of a torque device control by the control device 84 with respect to the torque device control by the control device 50 will be described.

First, linear state equations used for the determination of the manipulated variables using the linear programming method by the control device 84 of the present embodiment will be described. As shown in the following formula (37), the state quantity and manipulated variable that are used during the normal time (i.e., during non-shifting time) are the driving torque Tp and the engine torque Te, respectively. On the other hand, as shown in the following formula (38), the control variables used during the shifting are the torque (AT output shaft torque) To of an output shaft 82c of the automatic transmission 82, and the angular acceleration dωin/dt of the AT input shaft 82b. In more detail, the AT input shaft 82b corresponds to the output shaft of a torque converter 82d (i.e., the rotating shaft of a turbine runner). Furthermore, the manipulated variables are the torque capacities Tcr and Tce on the release side and engagement side, together with the engine torque Te. It should be noted that the reference characters c ($c_{11}, c_{12}, \ldots$) in formulas (37) and (38) are constant values that are basically defined in accordance with the hardware specifications, as described in the first embodiment. These also apply to fourth to ninth embodiments described below.

$$\text{Normal Time: } Tp = c11 \cdot Te \qquad (37)$$

$$\text{Shifting Time: } \begin{bmatrix} To \\ \dot{\omega}in \end{bmatrix} = \begin{bmatrix} c11 & c12 & c13 \\ c21 & c22 & c23 \end{bmatrix} \begin{bmatrix} Te \\ Tcr \\ Tce \end{bmatrix} \qquad (38)$$

Next, the objective function (evaluation function) f2 of the linear programming problem used to determine the operation variable in the manipulated variable determining section of the control device 84 at the time of shifting can be expressed as in the following equation (39).

$$\text{Minimization: } f2 = P_1(y_1^- + y_1^+) + P_2(y_2^- + y_2^+) \qquad (39)$$

$y_1^-$: Insufficient amount of AT output shaft torque To with respect to target value $y_1^+$: Excess amount of AT output shaft torque To with respect to target value $y_2^-$: Insufficient amount of angular acceleration dωin/dt of AT input shaft with respect to target value
$y_2^+$: Excess amount of angular acceleration dωin/dt of AT input shaft with respect to target value
$P_1$: Priority of AT output shaft Torque To
$P_2$: Priority of angular acceleration dωin/dt of AT input shaft An example of the constraints of the linear programming problem of the present embodiment can be expressed as the following formulas in accordance with the same idea as that of the first embodiment. It should be noted that the modification of the formulas for formulating each of the following formulas in the equation standard form can be performed in the same manner as in the first embodiment, and therefore, the description thereof will be omitted here.

$$c_{11}x_1 + c_{12}x_2 + c_{13}x_3 + y_1^- - y_1^+ = g_1$$

$$c_{21}x_1 + c_{22}x_2 + c_{23}x_3 + y_2^- - y_2^+ = g_2$$

$$Tomn \le c_{11}x_1 + c_{12}x_2 + c_{13}x_3 \le Tomx$$

$$\dot{\omega}innmn \le c_{21}x_1 + c_{22}x_2 + c_{23}x_3 \le \dot{\omega}innmx$$

$$Tcrmnr \le x_2 \le Tcrmxr$$

$$Tcemnr \le x_3 \le Tcemxr$$

$$0 \le x_1 \le Temx$$

$$Tcrmn \le x_2 \le Tcrmx$$

$$Tcemn \le x_3 \le Tcemx$$

$$y_i^-, y_i^+ \ge 0 \, (i=1,2,3)$$

$x_1$: Engine Torque Te
$x_2$: Torque capacity Tcr of clutch on the release side
$x_3$: Torque capacity Tce of clutch on the engagement side
$g_1$: Target value of AT output shaft torque To
$g_2$: Target value of angular acceleration dωin/dt of AT input shaft 82b
Tomn: Lower limit constraint value of engine torque Te (for guarantee of driving force)
Tomx: Upper limit constraint value of engine torque Te (for guarantee of driving force)
dωin/dtmn: Lower limit constraint value of angular acceleration of AT input shaft 82b (for guarantee of rotational speed)
dωin/dtmx: Upper limit constraint value of angular acceleration of AT input shaft 82b (for guarantee of rotational speed)
Tcrmnr: Lower limit constraint value regarding attainable torque capacity
Tcrmxr: Upper limit constraint value regarding attainable torque capacity
Tcemnr: Lower limit constraint value regarding attainable torque capacity
Tcemxr: Upper limit constraint value regarding attainable torque capacity
Temn: Lower limit constraint value of engine torque Te (for guarantee of operation of internal combustion engine 20)
Temx: Upper limit constraint value of engine torque Te (for guarantee of operation of internal combustion engine 20)
Tcrmn: Lower limit constraint value of torque capacity Tcr (for guarantee of operation of automatic transmission 82)
Tcrmx: Upper limit constraint value of torque capacity Tcr (for guarantee of operation of automatic transmission 82)
Tcemn: Lower limit constraint value of torque capacity Tce (for guarantee of operation of automatic transmission 82)
Tcemx: Upper limit constraint value of torque capacity Tce (for guarantee of operation of automatic transmission 82)

There is a response delay in the shifting operation of the automatic transmission 82 that uses hydraulic pressure, and therefore, in the present embodiment, the automatic transmission 82 corresponds to the "second torque device". On that basis, as described above, the constraints used in the present embodiment include the upper and lower limit constraint values Tcrmnr, Tcrmxr, Tcemnr and Tcemxr regarding the attainable (reachable) torque capacity. According to these upper and lower limit constraint values such as Tcrmnr, when the torque capacities Tcr and Tce are commanded at a time step during the shifting (more specifically, during the shifting operation), the torque capacity range that can be attained at the next time step is identified. It should be noted that the attainable torque capacity corresponds to another example of the "attainable manipulated variable" according to the present disclosure.

The manipulated variable upper and lower limit calculation section included in the control device 84 calculates the upper and lower limit constraint values Tcrmnr, Tcrmxr, Tcemnr and Tcemxr regarding the attainable torque capacity by, for example, using the following method. That is, the control device 84 stores relational information (e.g., maps not shown) that individually defines the relationships of each of the upper and lower limit constraint values Tcrmnr and Tcrmxr to the current rotational speed Nat and estimated torque capacity Tcrest of the AT input shaft 82b. The control device 84 calculates, from these maps, the upper and lower limit constraint values Tcrmnr and Tcrmxr depending on the current rotational speed Nat and estimated torque capacity Tcrest of the AT input shaft 82b. Similarly, the control device 84 stores relational information (e.g., maps not shown) that individually defines the relationships of each of the upper and lower limit constraint values Tcemnr and Tcemxr to the current rotational speed Nat and estimated torque capacity Tceest. The control device 84 calculates, from these maps, the upper and lower limit constraint values Tcemnr and Tcemxr depending on the current rotational speed Nat and estimated torque capacity Tceest of the AT input shaft 82b.

The current rotational speed Nat of the AT input shaft 82b is obtained using, for example, a rotational speed sensor included in the sensors 86. The current estimated torque capacity Tcrest can be calculated using, for example, relational information (e.g., a map which is not shown) that defines the relationship of the estimated torque capacity Tcrest to the rotational speed Nat and estimated input torque Tatin of the AT input shaft 82b. The current estimated torque capacity Tceest can also be calculated by the same method. In addition, the estimated input torque Tatin is the torque input to the AT input shaft 82b and can be calculated by, for example, any known method based on predetermined parameters such as the depression amount of an accelerator pedal of the vehicle.

Additionally, in the present embodiment, the rotational speed Nat and the estimated torque capacities Tcrest and Tceest of the AT input shaft 82b correspond to an example of "the rotational speed and the estimated manipulated variable of the second torque device" according to the present disclosure.

As described so far, the constraints of the linear programming problem of the present embodiment include the upper and lower limit constraint values such as Tcrmnr regarding the attainable torque capacity. Therefore, according to the torque device control of the present embodiment, similarly to the first embodiment, the following effects can be obtained for the powertrain system 80 including the automatic transmission 82 as the second torque device having a relatively large response delay. That is, it is possible to determine appropriate manipulated variables of all the torque devices in consideration of the response delay of the automatic transmission 82 at the time of shifting while reducing an increase in the amount of calculation (calculation load) for optimizing all the manipulated variables. In addition, the same effects as those of the first embodiment can be obtained.

Additionally, the control device 84 according to the present embodiment may additionally include a manipulated variable correction section similar to the manipulated variable correction section 72b of the control device 70 (see FIG. 8) according to the second embodiment.

4. Fourth Embodiment

Figure 12:
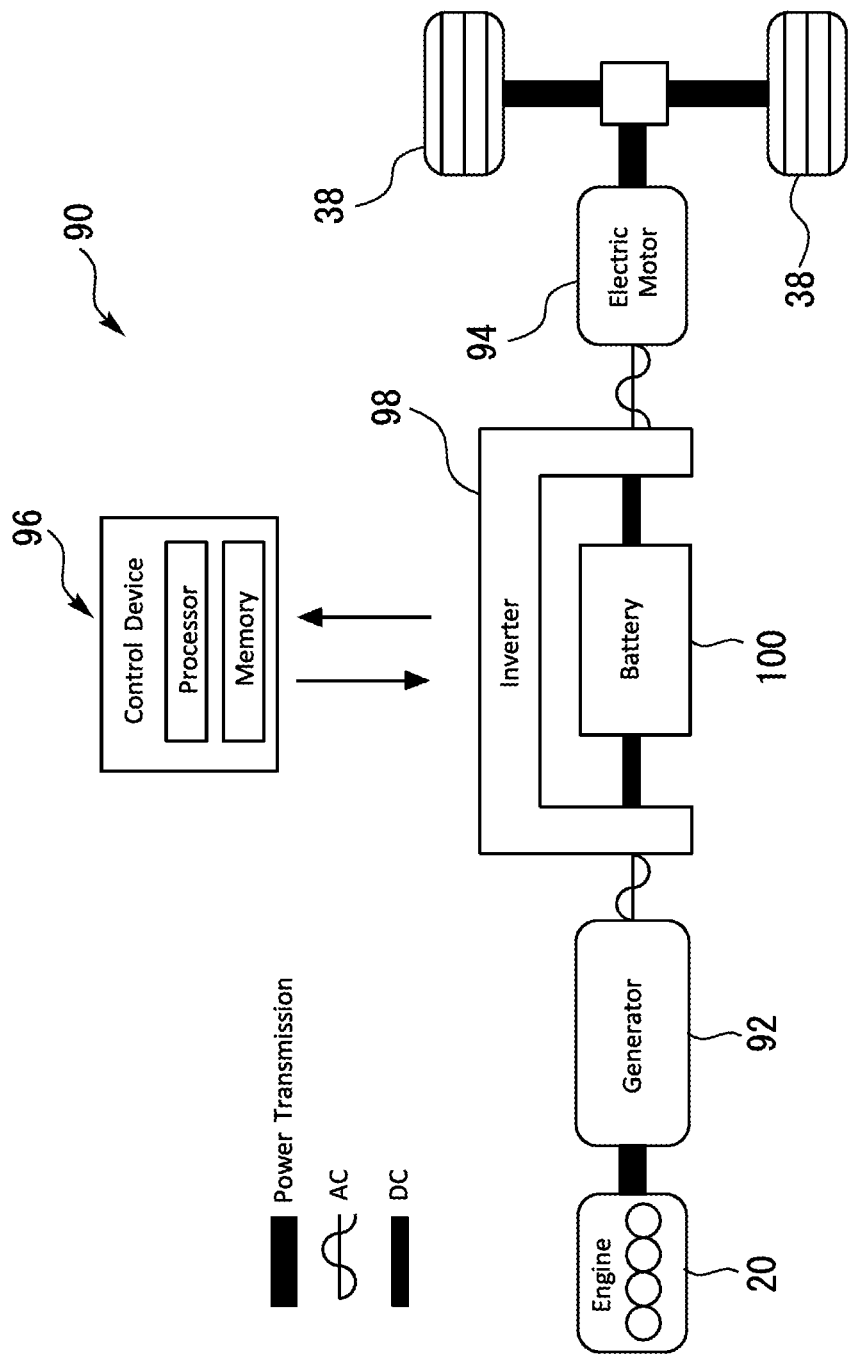
FIG. 12 is a schematic diagram that illustrates an example of a configuration of a powertrain system according to a fourth embodiment of the present disclosure.

Then, a fourth embodiment according to the present disclosure will be described with reference to FIG. 12. FIG. 12 is a schematic diagram that illustrates an example of the configuration of a powertrain system 90 according to the fourth embodiment of the present disclosure. The powertrain system 90 shown in FIG. 12 is provided with a generator 92 and an electric motor 94 together with the internal combustion engine 20. In this example, similarly to the first embodiment, each of the generator 92 and the electric motor 94 corresponds to the "first torque device", and the internal combustion engine 20 corresponds to the "second torque device".

The powertrain system 90 is further provided with a control device 96 that controls these first and second torque devices. The control device 96 controls an inverter 98 such that the generator 92 performs electric power generation using the engine torque Te. The electric power generated by the generator 92 is stored in a battery 100. The control device 96 controls the inverter 98 such that the electric motor 94 drives the wheels 38 using the electric power stored in the battery 100. Thus, the powertrain system 90 is a so-called series hybrid system. In addition, according to the example shown in FIG. 12, the internal combustion engine 20 and the generator 92 do not directly generate the driving force of the vehicle. However, the generator 92 absorbs the torque generated by the internal combustion engine 20 to generate electric power used for driving the vehicle, and therefore, the internal combustion engine 20 and the generator 92 in this example also correspond to an example of the torque devices "associated with control of the driving force of the vehicle".

As an example, the state quantities (control variables) controlled by the powertrain system 90 are the driving torque Tp, the charge/discharge amount Pchg and the rotational speed change rate dNg similarly to the powertrain system 10. Moreover, similarly to the powertrain system 10, the manipulated variables of the torque devices in the present embodiment are the engine torque Te, the torque Tg of the generator 92 and the torque Tm of the electric motor 94. The relationships between control variables and the manipulated variables used in the present embodiment can also be expressed with linear state equations as shown by formula (40) described below.

A similar torque device control to the first or second embodiment may be performed for the above-described powertrain system 90 by the use of the state equations shown as formula (40) and the linear programming method. It should be noted that the objective function may be determined on the basis of a similar way to formula (2). In accordance with a similar way to the first embodiment, the constraints may include the upper limit constraint value Temxr and the lower limit constraint value Temnr regarding the attainable engine torque Te and be set properly with regard to each of the state quantities and the manipulated variables.

5. Fifth Embodiment

Figure 13:
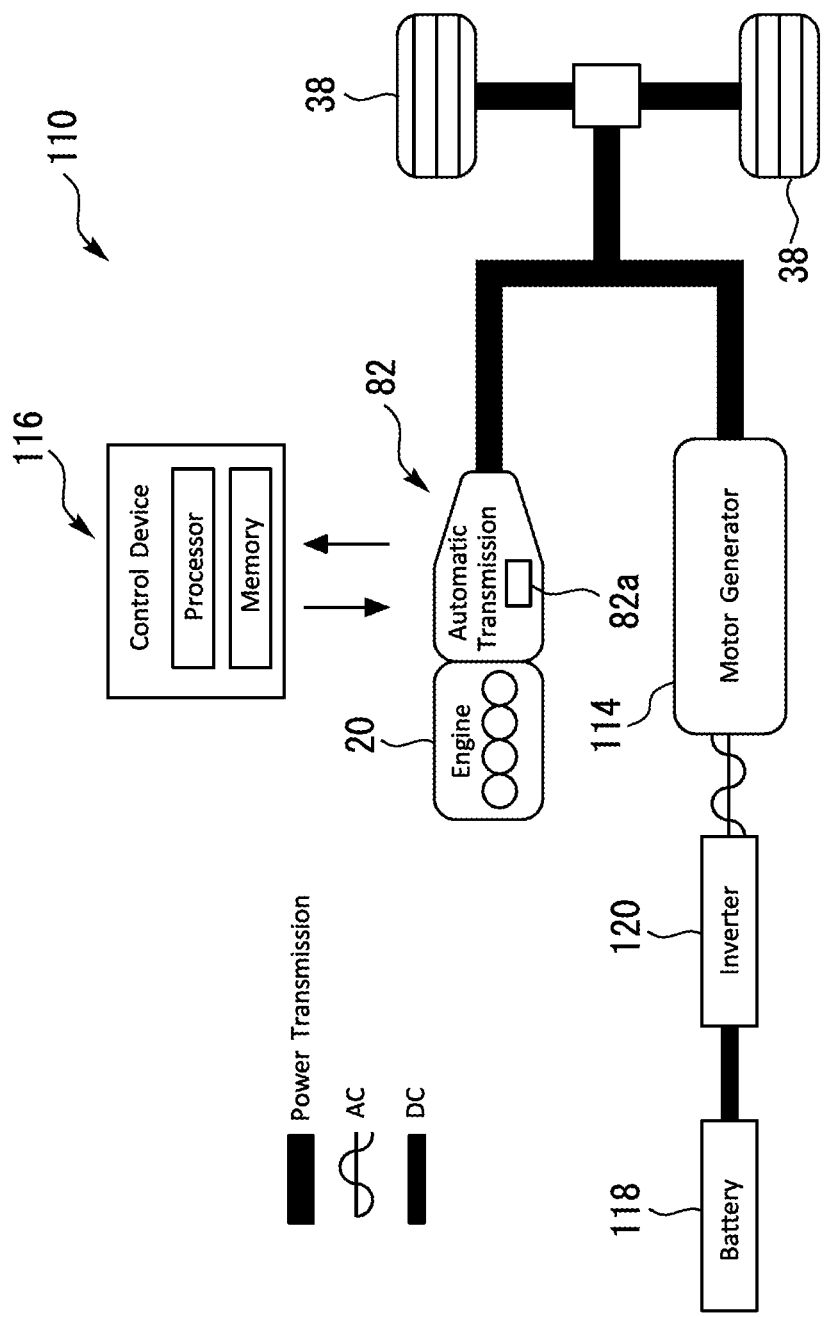
FIG. 13 is a schematic diagram that illustrates an example of a configuration of a powertrain system according to a fifth embodiment of the present disclosure.

Then, a fifth embodiment according to the present disclosure will be described with reference to FIG. 13. FIG. 13 is a schematic diagram that illustrates an example of the configuration of a powertrain system 110 according to the fifth embodiment of the present disclosure. According to the powertrain system 110 shown in FIG. 13, the internal combustion engine 20 combined with a stepped automatic transmission 82 is connected in parallel to a motor generator 114. In this example, similarly to the first embodiment, the motor generator 114 corresponds to the "first torque device", and each of the internal combustion engine 20 and the automatic transmission 82 corresponds to the "second torque device". That is, in this example, there are a plurality of second torque devices.

To be more specific, the wheels 38 can be driven using a torque transmitted from the internal combustion engine 20 via the automatic transmission 82 and a torque Tmg of the motor generator 114. The electric power required to generate the motor generator torque Tmg is supplied from a battery 118. A control device 116 for controlling the individual torque devices controls an inverter 120 such that the motor generator 114 performs an electric power generation using the internal combustion engine 20 and a regenerative power generation during the deceleration of the vehicle. The electric power generated as a result is stored in the battery 118. As just described, the powertrain system 110 is a so-called parallel hybrid system.

Then, linear state equations used for the determination of manipulated variables using the linear programming method by the control device 116 will be described. As an example, state quantities (control variables) and the manipulated variables that are controlled by the powertrain system 110 are different depending on whether the vehicle is during the normal time (non-shifting time) or during the shifting time, as described below.

In detail, as shown in formula (41) described below, during the normal time (non-shifting time), the driving torque Tp and the charge/discharge amount Pchg are used as the state quantities, and the engine torque Te and the motor generator torque Tmg are used as the manipulated variables. It should be noted that, when the gear position is changed, the inertia and gear ratios changes and, as a result, a part of the constant values c ($c_{11}, c_{12}, \ldots$) in formulas (41) and (42) changes. This also applies to formulas (43)-(46) described below.

$$\begin{bmatrix} Tp \\ Pchg \\ dNg \end{bmatrix} = \begin{bmatrix} c11 & c12 & c13 \\ c21 & c22 & c23 \\ c31 & c33 & c33 \end{bmatrix} \begin{bmatrix} Te \\ Tg \\ Tm \end{bmatrix} \quad (40)$$

$$\text{Normal Time:} \begin{bmatrix} Tp \\ Pchg \end{bmatrix} = \begin{bmatrix} c11 & c12 \\ c21 & c22 \end{bmatrix} \begin{bmatrix} Te \\ Tmg \end{bmatrix} \quad (41)$$

On the other hand, as shown in formula (42) described below, the state quantities used at the time of the shifting include a rotational speed change rate dω in addition to the driving torque Tp and the charge/discharge amount Pchg. An example of the rotational speed change rate dω is an engine speed change rate dNe, or a rotational speed change rate of an input shaft of the automatic transmission 82 may be used instead thereof. In addition, the manipulated variables include Tcr and Tce in addition to the engine torque Te and the motor generator torque Tmg. Tcr corresponds to a torque capacity of a clutch among the plurality of clutches 82a of the automatic transmission 82, which is released during the shifting. Tce corresponds to a torque capacity of a clutch among them, which is engaged during the shifting.

$$\text{Shifting Time:} \begin{bmatrix} Tp \\ Pchg \\ d\omega \end{bmatrix} = \begin{bmatrix} c11 & c12 & c13 & c14 \\ c21 & c22 & c23 & c24 \\ c31 & c33 & c33 & c34 \end{bmatrix} \begin{bmatrix} Te \\ Tmg \\ Tcr \\ Tce \end{bmatrix} \quad (42)$$

The same torque device control as in the first or second embodiment may be executed on the powertrain system 110 described above by using the equations of state shown in formulas (41) and (42) and the linear programming method. The constraints on the internal combustion engine 20, which is one of the second torque devices, include the upper limit constraint value Temxr and the lower limit constraint value Temnr regarding the attainable engine torque Te, based on the same concept as in the first embodiment. Furthermore, the constraints on the automatic transmission 82, which is the remaining second torque device, includes the upper and lower limit constraint values Tcrmnr, Tcrmxr, Tcemnr and Tcemxr regarding the attainable torque capacity, based on the same concept as in the third embodiment.

6. Sixth Embodiment

Figure 14:
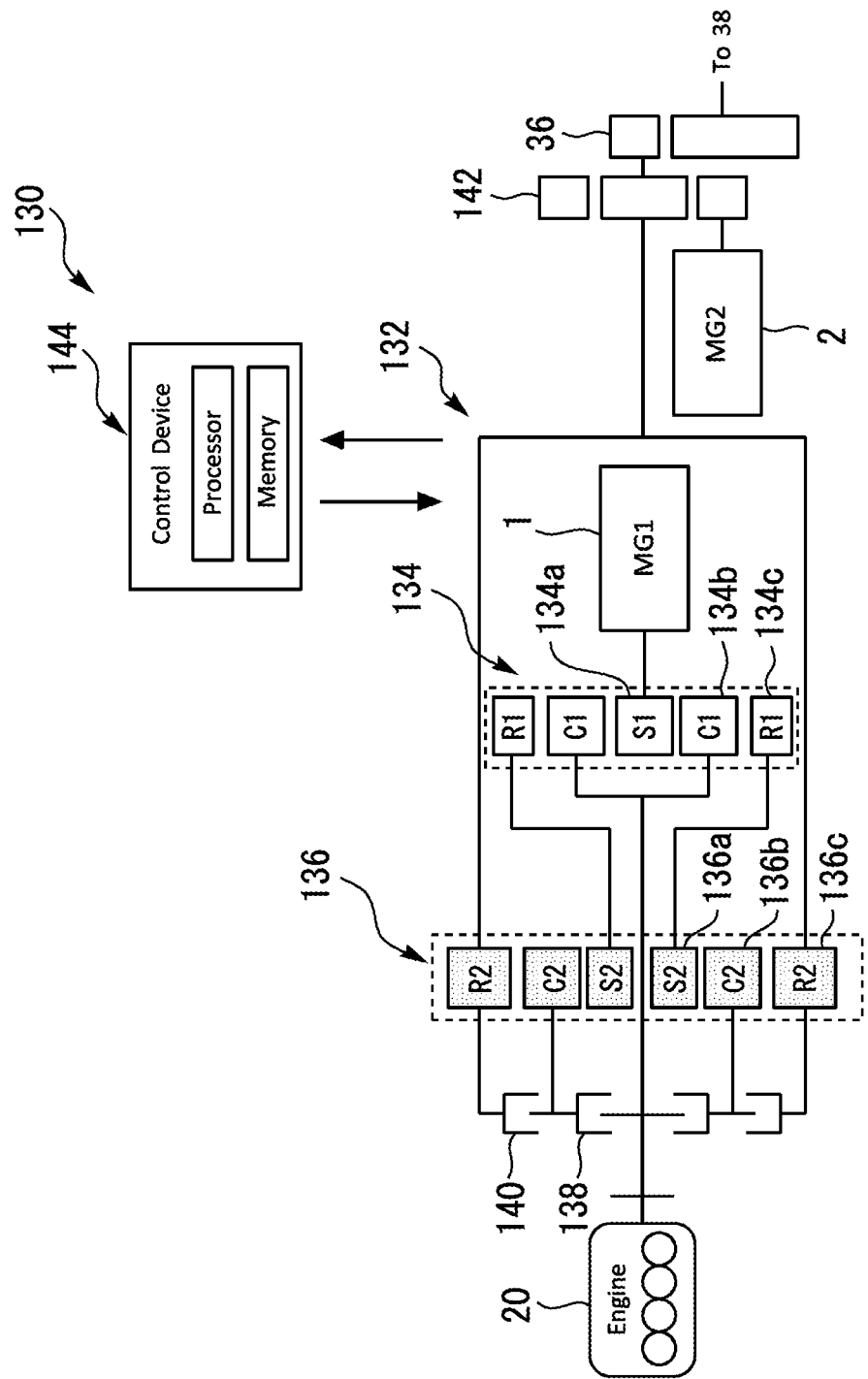
FIG. 14 is a schematic diagram that illustrates an example of a configuration of a powertrain system according to a sixth embodiment of the present disclosure.

Then, a sixth embodiment according to the present disclosure will be described with reference to FIG. 14. FIG. 14 is a schematic diagram that illustrates an example of the configuration of a powertrain system 130 according to the sixth embodiment of the present disclosure. Torque devices included in the powertrain system 130 shown in FIG. 14 are the internal combustion engine 20 (second torque device), the MG 1 and the MG 2 (first torque devices) similarly to the powertrain system 10. The powertrain system 130 is different from the powertrain system 10 in terms of the configuration of a power split device 132. The power split device 132 includes a first planetary gear unit 134, a second planetary gear unit 136, a low-speed clutch 138, a high-speed clutch 140 and a speed reducer 142. A control device 144 controls the torque devices described above. It should be noted that, in FIG. 14, illustration of an inverter and a battery is omitted.

To be more specific, the first planetary gear unit 134 includes a first sun gear 134a (S1), a first planetary carrier 134b (C1) and a first ring gear 134c (R1). The second planetary gear unit 136 includes a second sun gear 136a (S2), a second planetary carrier 136b (C2) and a second ring gear 136c (R2). The first sun gear 134a is connected to the MG 1, and the first planetary carrier 134b is connected to the internal combustion engine 20. In contrast to the power split device 34 shown in FIG. 1, the ring gear 134c is connected to the second sun gear 136a and can rotate integrally with the second sun gear 136a.

The low-speed clutch 138 is configured to be engageable with the second sun gear 136a and the second planetary carrier 136b. The high-speed clutch 140 is configured to be engageable with the second planetary carrier 136b and the second ring gear 136c. An example of these clutches 138 and 140 is a dog clutch. The second ring gear 136c is connected to the speed reducer 142. Moreover, the MG 2 is also connected to the speed reducer 142. The speed reducer 142 is configured to reduce the rotational speed of the MG 2 with respect to the rotational speed of an output shaft of the second ring gear 136c. The torque from the second ring gear 136c and the MG2 torque Tm are transmitted to the wheels 38 via the speed reducer 142 and the speed reducer 36. As above, the powertrain system 130 is a power-split hybrid system similarly to the powertrain system 10.

According to the powertrain system 130 described above, the gear shifting can be performed by controlling engagement/disengagement of the clutches 138 and 140. In detail, when the low-speed clutch 138 is engaged, the second sun gear 136a and the second planetary carrier 136b become able to rotate together, and, when, on the other hand, the high-speed clutch 140 is engaged, the second planetary carrier 136b and the second ring gear 136c become able to rotate together. The second planetary gear unit 136 is configured (i.e., gear ratios thereof are selected) so as to increase the speed of the output shaft of the second ring gear 136c when the high-speed clutch 140 is engaged and the low-speed clutch 138 is released (i.e., in a high-speed mode) as compared to when the low-speed clutch 138 is engaged and the high-speed clutch 140 is released (i.e., in a low-speed mode).

Then, linear state equations used by a control device 144 to determine the manipulated variables using the linear programming method will be described. The state quantities (control variables) and the manipulated variables that are controlled by the present powertrain system 130 are also different depending on whether the vehicle is during the normal time (non-shifting time) or during the shifting time, as an example shown below.

In detail, as shown in formula (43) described below, similarly to the powertrain system 10, the control variables used during the normal time (non-shifting time) are the driving torque Tp, the charge/discharge amount Pchg and the rotational speed change rate dNg, and the manipulated variables are the engine torque Te, the MG1 torque Tg and the MG2 torque Tm.

$$\text{Normal Time:} \begin{bmatrix} Tp \\ Pchg \\ dNg \end{bmatrix} = \begin{bmatrix} c11 & c12 & c13 \\ c21 & c22 & c23 \\ c31 & c33 & c33 \end{bmatrix} \begin{bmatrix} Te \\ Tg \\ Tm \end{bmatrix} \quad (43)$$

On the other hand, as shown by formula (44) described below, the control variables used during the shifting include Txl and Txh in addition to the driving torque Tp, the charge/discharge amount Pchg and the rotational speed change rate dNg. Txl is a transmitted torque (i.e., allotted torque) that the low-speed clutch 138 needs to handle when the low-speed mode is selected, and Txh is a transmitted torque (i.e., allotted torque) that the high-speed clutch 140 needs to handle when the high-speed mode is selected. The manipulated variables used during the shifting time are the same as those of the normal time.

$$\text{Shifting Time:} \begin{bmatrix} Tp \\ Pchg \\ dNg \\ Txl \\ Txh \end{bmatrix} = \begin{bmatrix} c11 & c12 & c13 \\ c21 & c22 & c23 \\ c31 & c33 & c33 \\ c41 & c42 & c43 \\ c51 & c52 & c53 \end{bmatrix} \begin{bmatrix} Te \\ Tg \\ Tm \end{bmatrix} \quad (44)$$

Additionally, in the example of the shifting time shown in formula (44), the number of the control variables are five and the number of the manipulated variables are three. Even in examples in which the number of the control variables are greater than the number of the manipulated variables in this way, it is possible to solve a linear programming problem mathematically while prioritizing all of the five control variables. Because of this, the linear programming problem may be solved using all of the five state quantities as target state quantities as shown in formula (44). On the other hand, the number of the control variables that can be explicitly (directly) controlled is three, which is the same as the number of the manipulated variables. Accordingly, the linear programming problem may be solved by excluding the fourth and fifth control variables in the priority order from formula (44) (that is, by aligning the number of the control variables and the number of the manipulated variables). As a result, optimal manipulated variables can be determined while reducing the calculation load. This also applies to an example (see formula (46)) of a linear programming problem for the shifting time in the following seventh embodiment.

The same torque device control as in the first or second embodiment may be executed on the powertrain system 130 described above by using the equations of state shown in formulas (43) and (44) and the linear programming method. The constraints on the internal combustion engine 20 include the upper limit constraint value Temxr and the lower limit constraint value Temnr regarding the attainable engine torque Te, based on the same concept as in the first embodiment.

7. Seventh Embodiment

Figure 15:
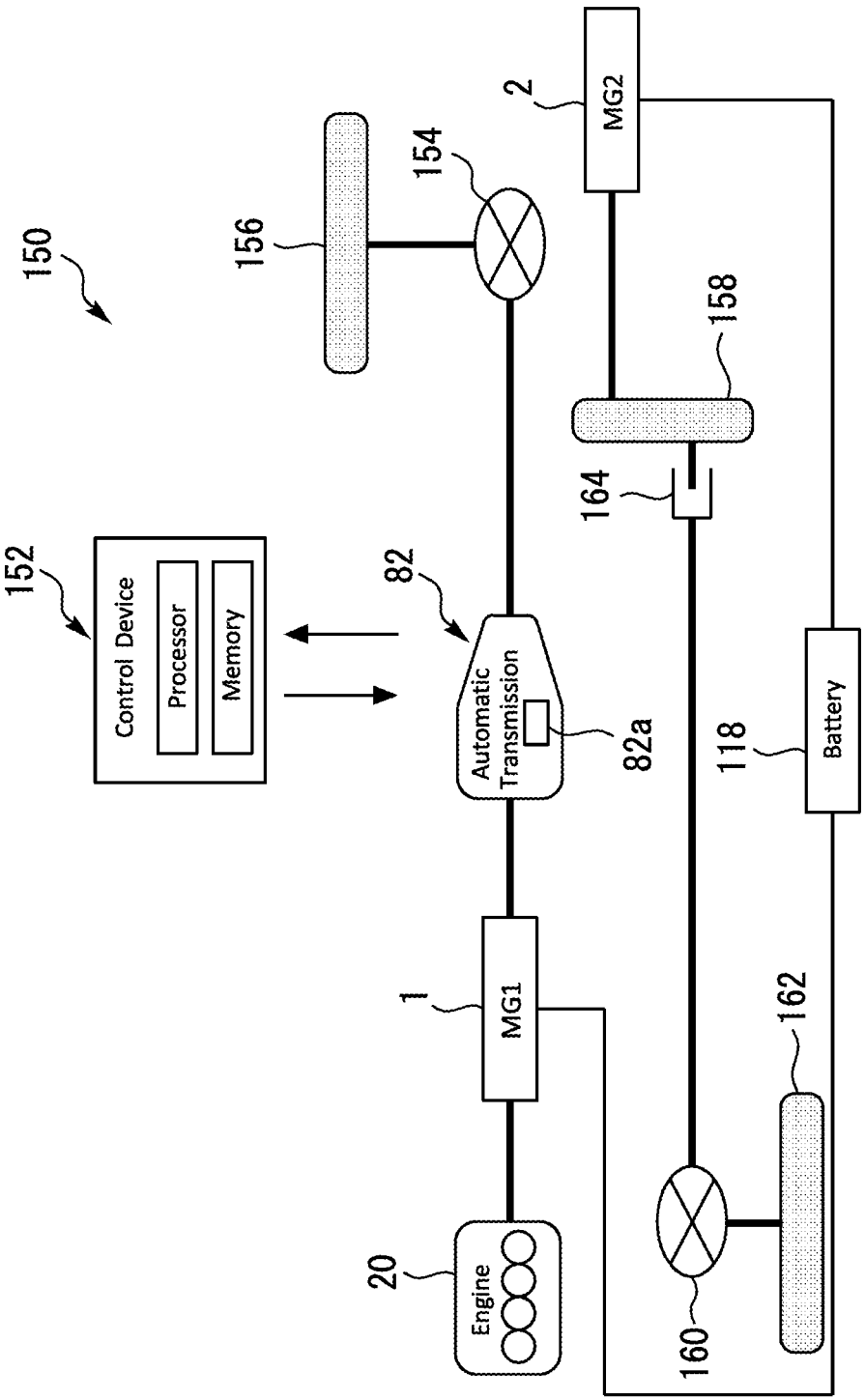
FIG. 15 is a schematic diagram that illustrates an example of a configuration of a powertrain system according to a seventh embodiment of the present disclosure.

Then, a seventh embodiment according to the present disclosure will be described with reference to FIG. 15. FIG. 15 is a schematic diagram that illustrates an example of the configuration of a powertrain system 150 according to the seventh embodiment of the present disclosure. The powertrain system 150 shown in FIG. 15 is provided with the internal combustion engine 20, the MG 1, the MG 2 and the automatic transmission 82, which correspond to torque devices controlled by a control device 152. It should be noted that, in FIG. 15, illustration of an inverter is omitted. In this example, the MG 1 and the MG 2 correspond to the "first torque devices", and the internal combustion engine 20 and the automatic transmission 82 correspond to the "second torque devices".

To be more specific, the MG 1 is arranged between the internal combustion engine 20 and the automatic transmission 82. The output shaft of the automatic transmission 82 is connected to rear wheels 156 with a differential gear 154 interposed therebetween. The rear wheels 156 can be driven by the internal combustion engine 20. In addition, the rear wheels 156 can also be driven by the MG 1 that functions as an electric motor. The MG 1 also functions as a generator and can perform an electric power generation using the internal combustion engine 20 and a regenerative power generation during the deceleration of the vehicle. On the other hand, the MG 2 is connected to front wheels 162 with a speed reducer 158 and a differential gear 160 that are interposed therebetween. A dog clutch 164 is arranged between the speed reducer 158 and the differential gear 160. The MG 2 can drive the front wheels 162 when it functions as an electric motor, and can also perform a regenerative power generation when it functions as a generator during the deceleration of the vehicle. The battery 118 receives the supply of the electric power from the MG 1 and the MG 2 that each function as a generator, and supplies an electric power to the MG 1 and the MG 2 that each function as an electric motor. In this way, the powertrain system 150 is a so-called series-parallel hybrid system.

Then, linear state equations used by a control device 152 to determine the manipulated variables using the linear programming method will be described. The state quantities (control variables) and the manipulated variables that are controlled by the present powertrain system 150 are different depending on whether the vehicle is during the normal time (non-shifting time) or during a shifting time associated with a clutch operation, as an example shown below.

In detail, as shown by formula (45) described below, the control variables used during the normal time (non-shifting time) are a driving torque Tpf of the front wheels 162, a driving torque Tpr of the rear wheels 156, and the charge/discharge amount Pchg. The manipulated variables are the engine torque Te, an MG1 torque Tmg1 and an MG2 torque Tmg2.

$$\text{Normal Time:} \begin{bmatrix} Tpf \\ Tpr \\ Pchg \end{bmatrix} = \begin{bmatrix} c11 & c12 & c13 \\ c21 & c22 & c23 \\ c31 & c33 & c33 \end{bmatrix} \begin{bmatrix} Te \\ Tmg1 \\ Tmg2 \end{bmatrix} \quad (45)$$

On the other hand, as shown by formula (46) described below, the control variables used during the shifting time associated with a clutch operation include the MG1 rotational speed change rate dNg, the MG2 rotational speed change rate dNm and Tx in addition to the driving torques Tpf and Tpr and the charge/discharge amount Pchg. Tx is a transmitted torque (i.e., allotted torque) that the dog clutch 164 needs to handle. In addition, the manipulated variables include the individual torque capacities Tcr and Tce of the automatic transmission 82 in addition to the engine torque Te, the MG1 torque Tmg1 and the MG2 torque Tmg2.

$$\text{Shifting Time:} \begin{bmatrix} Tpf \\ Tpr \\ Pchg \\ dNg \\ dNm \\ Tx \end{bmatrix} = \begin{bmatrix} c11 & c12 & c13 & c14 & c15 \\ c21 & c22 & c23 & c24 & c25 \\ c31 & c32 & c33 & c34 & c35 \\ c41 & c42 & c43 & c44 & c45 \\ c51 & c52 & c53 & c54 & c55 \\ c61 & c62 & c63 & c64 & c65 \end{bmatrix} \begin{bmatrix} Te \\ Tmg1 \\ Tmg2 \\ Tcr \\ Tce \end{bmatrix} \quad (46)$$

The same torque device control as in the first or second embodiment may be executed on the powertrain system 150 described above by using the equations of state shown in formulas (45) and (46) and the linear programming method. The constraints on the internal combustion engine 20, which is one of the second torque devices, include the upper limit constraint value Temxr and the lower limit constraint value Temnr regarding the attainable engine torque Te, based on the same concept as in the first embodiment. Furthermore, the constraints on the automatic transmission 82, which is the remaining second torque device, includes the upper and lower limit constraint values Tcrmnr, Tcrmxr, Tcemnr and Tcemxr regarding the attainable torque capacity, based on the same concept as in the third embodiment.

8. Eighth Embodiment

Then, an eighth embodiment according to the present disclosure will be described.

8-1. Issue on Powertrain System According to First to Seventh Embodiments

According to the first embodiment (similarly, according to the second to seventh embodiments), the constraints (see formulas (6)-(8)) concerning the upper and lower limits of the individual control variables (Tp, Pchg and dNg) must always be satisfied in calculating the manipulated variables (Te, Tg and Tm) while minimizing the deviation from the target values of the control variables. As a result, even if the individual manipulated variables are moved freely within those constraints (see formulas (9)-(12)), the constraints concerning the upper and lower limits of the control variables may no longer be satisfied. When the constraints concerning the upper and lower limits of the control variables are not satisfied in calculating the manipulated variables, there is no solution (feasible solution) of the linear programming problem F. Because of this, an optimal manipulated variable searcher (in the example of the first embodiment, the manipulated variable determination section 58) for solving the linear programming problem F can no longer determine the manipulated variables.

8-2. Example of Setting of Objective Function and Constraints According to Eighth Embodiment A powertrain system according to the eighth embodiment is different from the powertrain system 10 according to the first embodiment in terms of the following points. In detail, in view of the issue described above, according to the present embodiment, the manner of formulation of the objective function and the constraints used to determine the manipulated variables (Te, Tg and Tm) is changed as follows, as compared to the first embodiment.

Formula (47) described below represents an example of an objective function (evaluation function) f3 of a linear programming problem used by the manipulated variable determination section 58 to determine the manipulated variables in the present embodiment. In addition, formulas (3)-(5), (9)-(12), and (48)-(54) described below represent an example of the constraints used along with this objective function f3.

Minimization: $f3 = P_1(y_1^- + y_1^+) + P_2(y_2^- + y_2^+) + P_3(y_3^- + y_3^+) +$ $$P_4(y_4^- + y_5^+) + P_5(y_6^- + y_7^+) + P_6(y_8^- + y_9^+) \quad (47)$$

Constraints:

$$c_{11}x_1 + c_{12}x_2 + c_{13}x_3 + y_1^- - y_1^+ = g_1 \quad (3)$$

$$c_{21}x_1 c_{22}x_2 + c_{23}x_3 + y_2^- - y_2^+ = g_2 \quad (4)$$

$$c_{31}x_1 c_{32}x_2 c_{33}x_3 + y_3^- - y_3^+ = g_3 \quad (5)$$

$$c_{11}x_1 + c_{12}x_2 + c_{13}x_3 + y_4^- - y_4^+ = Tpmn \quad (48)$$

$$c_{11}x_1 + c_{12}x_2 + c_{13}x_3 + y_5^- - y_5^+ = Tpmx \quad (49)$$

$$c_{21}x_1 + c_{22}x_2 + c_{23}x_3 + y_6^- - y_6^+ = Win \quad (50)$$

$$c_{21}x_1 + c_{22}x_2 + c_{23}x_3 + y_7^- - y_7^+ = Wout \quad (51)$$

$$c_{31}x_1 + c_{32}x_2 + c_{33}x_3 + y_8^- - y_8^+ = dNgmn \quad (52)$$

$$c_{31}x_1 c_{32}x_2 + c_{33}x_3 + y_9^- - y_9^+ = dNgmx \quad (53)$$

$$Temnr \leq x_1 \leq Temxr \quad (9)$$

$$0 \leq x_1 \leq Temx \quad (10)$$

$$Tgmn \leq x_2 \leq Tgmx \quad (11)$$

$$Tmmn \leq x_3 \leq Tmmx \quad (12)$$

$$y_i^-, y_i^+ \geq 0 (i=1,2,\ldots,9) \quad (54)$$

As described above, according to the constraints used in the present embodiment, formulas (48)-(53) concerning the upper and lower limit constraint values of the respective control variables (Tp, Pchg and dNg) are changed from formulas (6)-(8) used in the first embodiment. Moreover, in accompaniment with this, formula (13) is changed as shown by formula (54). To be more specific, reference characters $y_i^-$ and $y_1^+$ (i=4 to 9) in formulas (48)-(53) are as follows.

$y_4^-$: Excess amount of the driving torque Tp with respect to the lower limit constraint value Tpmn $y_4^+$: Margin amount of the driving torque Tp with respect to the lower limit constraint value Tpmn $y_5^-$: Margin amount of the driving torque Tp with respect to the upper limit constraint value Tpmx $y_5^+$: Excess amount of the driving torque Tp with respect to the upper limit constraint value Tpmx $y_6^-$: Excess amount of the charge/discharge amount Pchg with respect to the lower limit constraint value Win $y_6^+$: Margin amount of the charge/discharge amount Pchg with respect to the lower limit constraint value Win $y_7^-$: Margin amount of the charge/discharge amount Pchg with respect to the upper limit constraint value Wout $y_7^+$: Excess amount of the charge/discharge amount Pchg with respect to the upper limit constraint value Wout $y_8^-$: Excess amount of the rotational speed change rate dNg with respect to the lower limit constraint value dNgmn $y_8^+$: Margin amount of the rotational speed change rate dNg with respect to the lower limit constraint value dNgmn $y_9^-$: Margin amount of the rotational speed change rate dNg with respect to the upper limit constraint value dNgmx $y_9^+$: Excess amount of the rotational speed change rate dNg with respect to the upper limit constraint value dNgmx By the use of formulas (48)-(53) including the excess and margin amounts $y_i^-$ and $y_i^+$ (i=4-9) described above, the upper and lower constraints of the control variables are changed to equality constraints from inequality constraints according to formulas (6)-(8). It should be noted that, in the present embodiment, the constraints (see formulas (9)-(12) described above) concerning the upper and lower limits of the manipulated variables (Te, Tg and Tm) must be satisfied similarly to the other embodiments, such as the first embodiment.

On that basis, the objective function f3 according to the present embodiment has not only the same three terms as the right-hand side in formula (2) (i.e., three terms of the amounts of deviation of the individual control variables with respect to the target values) but also three terms regarding the excess amounts of the individual control variables with respect to the constraints. To be more specific, with regard to the latter three terms, the sum ($y_4^-$ and $y_5^+$) of two excess amounts $y_4^-$ and $y_5^+$ collectively indicates the excess amount of the driving torque Tp with respect to the lower limit constraint value Tpmn or the upper limit constraint value Tpmx. Reference character $P_4$ corresponds to the priority of these excess amounts ($y_4^-$ and $y_5^+$). Similarly, the sum ($y_6^-$ and $y_7^+$) corresponds to the excess amount of the charge/discharge amount Pchg with respect to the lower limit constraint value Win or the upper limit constraint value Wout, and reference character $P_5$ corresponds to the priority of these excess amounts ($y_6^-$ and $y_7^+$). The sum ($y_8^-$ and $y_9^+$) corresponds to the excess amounts of the rotational speed change rate dNg with respect to the lower limit constraint value dNgmn or the upper limit constraint value dNgmx, and reference character $P_6$ corresponds to the priority of these excess amounts ($y_8^-$ and $y_9^+$).

Furthermore, according to the present embodiment, the priorities $P_1$-$P_6$ are set as follows as an example. That is, the priorities $P_4$-$P_6$ concerning the compliance of the individual constraint values (the plurality of constraints) are set so as to become higher than the priorities $P_1$-$P_3$ concerning the achievement of the target values of the respective control variables (that is, $P_4$-$P_6$>$P_1$-$P_3$). Which priority is higher among the priorities $P_4$-$P_6$ can be freely set, and similarly, which priority is higher among the priorities $P_1$-$P_3$ can be freely set. As an example, with regard to the priorities $P_4$-$P_6$, the priority $P_4$ of the driving torque Tp becomes the highest, the priority $P_6$ of the rotational speed change rate dNg becomes the second highest, and the priority $P_5$ of the charge/discharge amount Pchg becomes the lowest ($P_4$>$P_6$>$P_5$). An example of the setting of the priorities $P_1$-$P_3$ is the same as that according to the first embodiment ($P_1$>$P_3$>$P_2$).

A specific example of the priorities $P_4$-$P_6$ in the objective function f3 according to the present embodiment is the priority order based on a similar manner to the first embodiment. Furthermore, as another specific example of the priorities $P_1$-$P_6$, the weight may be used as already described. On that basis, as a manner of determining the manipulated variables (Te, Tg and Tm) by solving the linear programming problem of the present embodiment that uses the objective function f3 shown by formula (47) and the constraints shown by formulas (3)-(5), (9)-(12), and (48)-(54), the manner described in the first embodiment can be used, for example.

8-3. Effect

By the use of the objective function f3 and the constraints according to the present embodiment described above, the manipulated variable determination section 58 determines the manipulated variables (Te, Tg and Tm) such that each shown in formula 47) becomes smaller in descending order of the priorities $P_1$-$P_6$. With regard to this kind of determination of the manipulated variables (Te, Tg and Tm), the following can be said based on three terms of excess amounts ($P_4$ ($y_4^-$+$y_5^+$), $P_5$ ($y_6^-$+$y_7^+$) and $P_6$ ($y_8^-$+$y_9^+$)) concerning the constraint values. That is, minimization of each excess amount can be achieved in descending order of the priorities $P_4$-$P_6$. In other words, each excess amount becomes difficult to be minimized in ascending order of the priorities $P_4$-$P_6$. As a result, when the manipulated variables are determined, the individual excess amounts become greater in ascending order of the priorities $P_4$-$P_6$.

Therefore, according to the present embodiment, when the manipulated variables are not determined while complying with a plurality of constraints on the upper and lower limits of the control variables (more specifically, when the manipulated variables are not determined while complying with formulas (6)-(8) according to the first embodiment), the manipulated variable determination section 58 executes the following processing. That is, the manipulated variables (Te, Tg and Tm) are determined while relaxing the plurality of constraints in ascending order of the priorities $P_4$-$P_6$. By relaxing the constraints in this way as needed, it becomes possible to avoid that the manipulated variables are unable to be determined.

(Supplemental Explanation of Significance of Change of Formulation)

Additionally, according to the present embodiment in which the change of the formulation is used in order to relax the constraints as needed, it is possible to avoid that the manipulated variables are not determined due to a reason described below. That is, according to the present embodiment, by the use of formulas (48)-(53), the upper and lower limit constraints of the control variables are changed to the equality constraints from the inequality constraints shown in formulas (6)-(8). Moreover, when formula (48) is taken as an example, according to these equality constraints, a value obtained by adding, to a combination ($c_{11}x_1$+$c_{12}x_2$+$c_{13}x_3$) of the control variables, a positive excess amount ($y_4^-$) of the control variable (Tp) with respect to the constraint value (Tpmn) and by subtracting a positive margin amount ($y_4^+$) from this combination becomes equal to the constraint value (Tpmn). According to this kind of equality constraints, when a combination of the control variables is given, each equation holds regardless of the change of excess amounts (such as $y_4^-$) or margin amounts (such as $y_4^-$). Because of this, it becomes possible to avoid a situation in which there is no solution to the linear programming problem (that is, a situation in which the manipulated variables are not determined).

(Minimization of Excess Amounts of Control Variables)

Moreover, by the use of the objective function f3 represented by formula (47), when the constraints concerning the respective constraint values are relaxed, minimization of the individual excess amounts can be achieved in descending order of the priorities $P_4$-$P_6$ as already described. In other words, according to the manipulated variable determination section 58, the plurality of constraints can be relaxed while minimizing the excess amount with respect to the upper limit constraint value or lower limit constraint value associated with each of the plurality of constraints (second constraint) in descending order of the priority. As just described, according to the present embodiment, it is possible to avoid that the manipulated variables are not determined while properly minimizing (optimizing) the excess amounts of the control variables with the priority taken into consideration.

(Setting of Priority: $P_4$-$P_6$>$P_1$-$P_3$)

Furthermore, according to the present embodiment, the priorities $P_4$-$P_6$ concerning the compliance of the individual constraint values of the control variables are set so as to become higher than the priorities $P_1$-$P_3$ concerning the achievement of the target values of the respective control variables. According to this kind of setting, it becomes possible to relax the constraints (i.e., to allow the excess of the upper or lower limit constraint value) in ascending order of the priorities $P_4$-$P_6$ when the constraints are unable to be complied with, while reducing the excess of the upper and lower limit constraint values of the respective control variables as compared to the achievement of the target values of the respective control variables. It should be noted that, according to the present embodiment, each of the constraints represented by formulas (3)-(5) corresponds to an example of the "first constraint" according to the present disclosure, and each of the constraints represented by formulas (48)-(53) corresponds to an example of the "second constraint" according to the present disclosure.

8-4. Modification Examples

The manner of changing the formulation which has been described in the eighth embodiment may be applied to the powertrain systems according to other second to seventh embodiments.

(Other Examples of Change of Formulation)

According to formula (47) in the eighth embodiment described above, the same priority $P_4$, $P_5$ or $P_6$ is assigned to the excess amount of each of the upper and lower limit constraint values with respect to the same control variable. However, the manner of assigning the priority with respect to the excess amount of the upper and lower limit constraint values of the control variables is not limited to the example described above, and may be a manner shown by formula (55) described below, for example. That is, according to an objective function f4 shown in formula (55), the priorities $P_4$-$P_9$ are respectively assigned to the excess amounts $y_4^-$, $y_5^+$, $y_6^-$, $y_7^+$, $y_8^-$ and $y_9^+$. As just described, the priority may be separately assigned to each of the excess amount of the upper limit constraint value and the excess amount of the lower limit constraint value with respect to the same control variable.

Minimization: $f4 = P_1(y_1^- + y_1^+) + P_2(y_2^- + y_2^+) + P_3(y_3^- + y_3^+) + P_4 y_4^- + P_5 y_5^+ +$ $P_6 y_6^- + P_7 y_7^+ + P_8 y_8^- + P_9 y_9^+$ (55)

Moreover, in the example of the constraints shown by formulas (48)-(53) in the eighth embodiment, the number of each of the upper and lower constraint values of the individual control variables is one. However, the number of the upper limit constraint value or lower limit constraint value with respect to the same control variable may be two or more. In other words, two or more constraints (constraint formulas) with respect to the same upper or lower limit constraint value may be set.

To be more specific, in the example in which the number of each of the upper limit constraint value and lower limit constraint value with respect to the same control variable is two, the priority may be separately assigned with respect to each of two upper limit constraint values and two lower limit constraint values. In addition, in this example, one priority may be assigned with respect to a pair of upper and lower limit constraint values (Tpmx1 and Tpmn1) that are included in two upper limit constraint values (for example, Tpmx1 and Tpmx2) and two lower limit constraint values (for example, Tpmn1 and Tpmn2), and another one priority may be assigned with respect to another pair of upper and lower limit constraint values (Tpmx2 and Tpmn2).

Moreover, formula (56) described below specifically exemplifies a manner of assigning the priority in the latter example as just described. Furthermore, an example of the setting of the priorities $P_1$-$P_9$ in an objective function f5 shown by formula (56) is $P_7 > P_9 > P_8 > P_6 > P_5 > P_4 > P_1 > P_3 > P_2$. It should be noted that, in the example shown in formula (56), the driving torque Tp has two lower limit constraint values Tpmn1 and Tpmn2 (Tpmn2<Tpmn1) and two upper limit constraint values Tpmx1 and Tpmx2 (Tpmx2>Tpmx1). Moreover, the reference characters $y_4^-$ and $y_4^{'-}$ are excess amounts of the drive toque Tp with respect to the lower limit constraint values Tpmn1 and Tpmn2, respectively. The reference characters $y_5^+$ and $y_5^{'+}$ are excess amounts of the drive toque Tp with respect to the upper limit constraint values Tpmx1 and Tpmx2, respectively. This also applies to a relationship between two lower limit constraint values Win1 and Win2 of the charge/discharge amount Pchg (Win2<Win1) and two upper limit constraint values Wout1 and Wout2 thereof (Wout2>Wout1), and the excess amounts of $y_6^-$, $y_6^{'-}$, $y_7^+$ and $y_7^{'+}$. The above also applies to a relationship between two lower limit constraint values dNgmn1 and dNgmn2 of the rotational speed change rate dNg (dNgmn2<dNgmn1) and two upper limit constraint values dNgmx1 and dNgmx2 thereof (dNgmx2>dNgmx1), and the excess amounts of $y_8^-$, $y_8^{'-}$, $y_9^+$ and $y_9^{'+}$.

Minimization: $f5 = P_1(y_1^- + y_1^+) + P_2(y_2^- + y_2^+) + P_3(y_3^- + y_3^+) + P_4(y_4^- + y_5^+) +$ $P_5(y_6^- + y_7^+) + P_6(y_8^- + y_9^+) + P_7(y_4^{'-} + y_5^{'+}) + P_8(y_6^{'-} + y_7^{'+}) + P_9(y_8^{'-} +$ $y_9^{'+})$ (56)

As exemplified so far, with regard to the manner of changing the formulation according to the eighth embodiment, the form of the objective function (evaluation function), the manner of assigning the priority, and the number of constraints (i.e., the number of upper and lower limit constraint values) can be freely determined. In addition, the gist of the above-described manner of changing the formulation is that the upper and lower limit constraint values of the control variables are handled by the equality constraints instead of the inequality constraints, and that a penalty according to the priority is given to each of excess amounts of the upper and lower limit constraint values in the objective function.

9. Ninth Embodiment

Then, a ninth embodiment according to the present disclosure and modification examples thereof will be described with reference to FIGS. 16 to 19. The present embodiment corresponds to another example of measures against the issue described in the section 8-1 regarding the eighth embodiment. However, in the present embodiment, the formulation as in the eighth embodiment is not performed. A powertrain system according to the present embodiment is different from the powertrain system 10 according to the first embodiment in that the processing described below is additionally performed. It should be noted that the processing described below may be applied to the powertrain systems according to other second to seventh embodiments.

9-1. Outline

According to the present embodiment, when the manipulated variables (Te, Tg and Tm) are not determined while complying with the plurality of constraints (formulas (6)-(8)) with the upper and lower constraint values of the control variables (Tp, Pchg and dNg), the manipulated variable determination section 58 enlarges the constraint values in sequence in ascending order of the priority (more specifically, priority order, for example). It should be noted that, concerning upper limit constraints, the phrase "enlarging the constraint values" mentioned here means increasing the value thereof and that, concerning lower limit constraints, it means decreasing the value thereof.

According to the present embodiment, when, no matter how the manipulated variables (Te, Tg and Tm) are controlled, the plurality of constraints concerning the constraint values of the control variables cannot be complied with, the enlargement of the constraint values as described above are used to determine the manipulated variables while relaxing one of the plurality of constraints in ascending priority order.

9-2. Processing by Control Device

Figure 16:
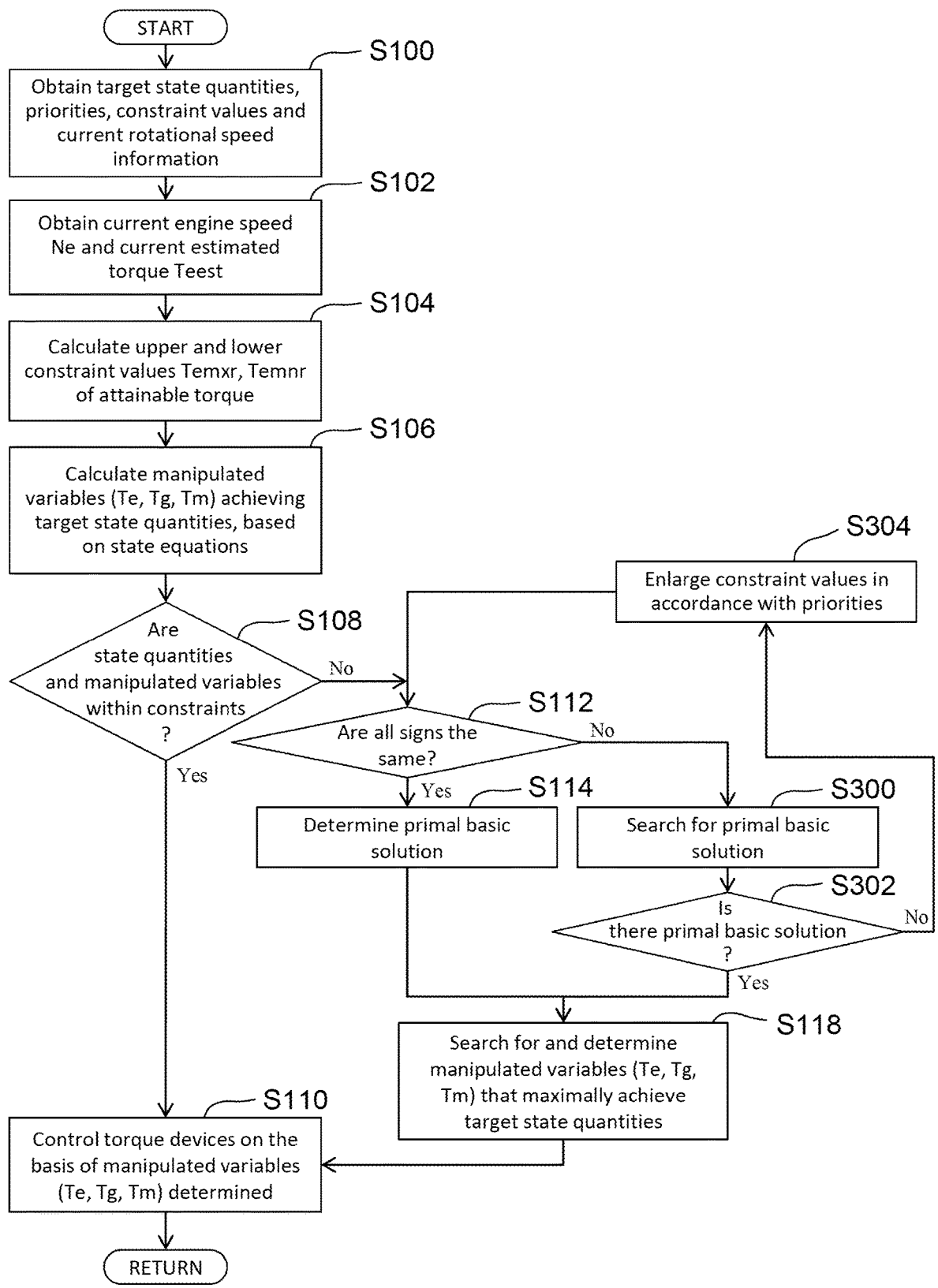
FIG. 16 is a flowchart that illustrates a routine of processing relating to a torque device control according to a ninth embodiment of the present disclosure.

FIG. 16 is a flowchart that illustrates a routine of the processing relating to a torque device control according to the ninth embodiment of the present disclosure. It should be noted that the processing of steps S100-S114 and S118 in the routine shown in FIG. 16 is as already described in the first embodiment.

If the determination result of step S112 is negative, the processing of the routine shown in FIG. 16 proceeds to step S300. In step S300, the control device 50 (manipulated variable determination section 58) searches for a primal basic solution using a similar processing to step S116.

Then, in step S302, the manipulated variable determination section 58 determines whether or not there is a primal basic solution. This determination is performed on the basis of whether or not the value of the objective function z (see formula (35) in the first embodiment) becomes zero (that is, whether or not all of the artificial variables $t_i$ become zero). If, as a result, the determination result of step S302 is positive (that is, if the value of the objective function z becomes zero), the primal basic solution is obtained and then, the processing proceeds to step S118.

If, on the other hand, the determination result of step S302 is negative (that is, if the value of the objective function z does not become zero), it is determined that there is no primal basic solution (i.e., there is no feasible solution that satisfies the constraints). Thereafter, the processing proceeds to step S304.

It is assumed that the priority orders (priorities) $P_4$-$P_9$ are respectively given to the constraint values (upper and lower limit constraint values Tpmn, Tpmx, Win, Wout, dNgmn and dNgmx) of the control variables (Tp, Pchg and dNg). The priority orders $P_4$-$P_9$ can be freely set as described in the eighth embodiment. In step S304, the manipulated variable determination section 58 enlarges the constraint values in accordance with the priority orders $P_4$-$P_9$ (more specifically, in ascending order of the priority orders $P_4$-$P_9$). It should be noted that the processing of step S304 is repeatedly performed as needed, until the determination result of step S302 becomes positive.

Figure 17:
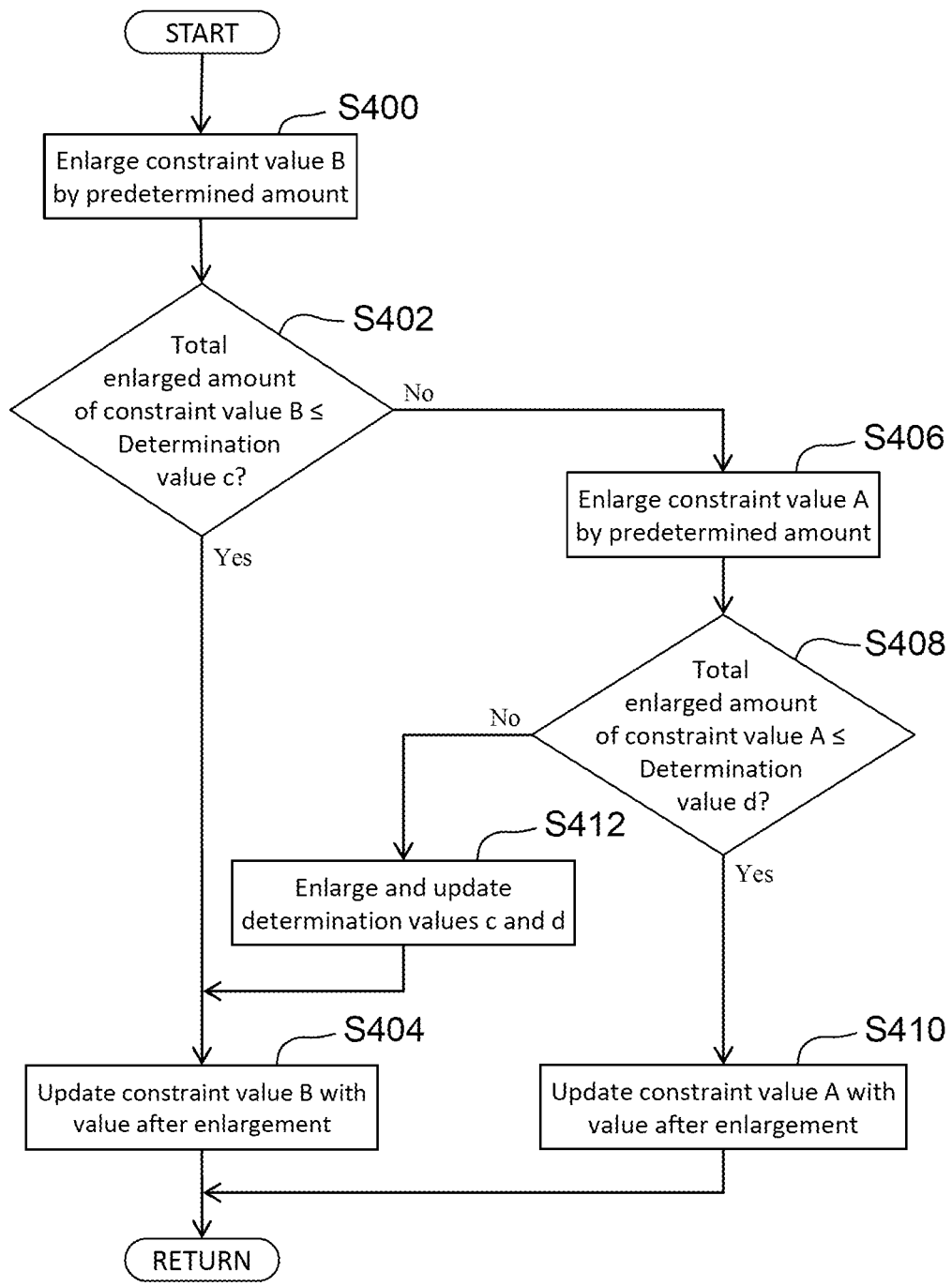
FIG. 17 is a flowchart that illustrates a routine for an example of a manner of enlarging constraint values used in processing of step S304.

FIG. 17 is a flowchart that illustrates a routine for an example of the manner of enlarging the constraint values used in the processing of step S304. Although the number of the constraint values of the control variables used in the present embodiment is six as described above, the manner of enlarging the constraint values are herein described using an example in which only two constraint values A and B are used and the priority order of the constraint value A is higher than that of the constraint value B, for ease of explanation.

According to the routine shown in FIG. 17, first, in step S400 the manipulated variable determination section 58 enlarges the constraint value B having a relatively low priority order by a desired predetermined amount. Then, in step S402, the manipulated variable determination section 58 determines whether or not the total enlargement amount of the constraint value B is less than or equal to a determination value c. The total enlargement amount of the constraint value B mentioned here corresponds to, for example, a difference of the current constraint value B with respect to a constraint value B (initial value) at the time of starting the processing of the present routine. Alternatively, this total enlargement amount may be reset to zero when the determination value c is updated by the processing of step S412 described below.

If the determination result of step S402 is positive (total enlargement amount of constraint value B≤determination value c), the processing proceeds to step S404. In step S404, the manipulated variable determination section 58 updates the constraint value B with a value after the enlargement by the processing of step S400. Thereafter, the current processing cycle is ended.

If, on the other hand, the determination result of step S402 is negative, that is, if the total enlargement value of the constraint value B has exceeded the determination value c (total enlargement amount of constraint value B>determination value c), the processing proceeds to step S406. In step S406, the manipulated variable determination section 58 enlarges the constraint value A having a relatively high priority order by a desired predetermined amount, instead of the constraint value B. Then, in step S408, the manipulated variable determination section 58 determines whether or not the total enlargement amount of the constraint value A is less than or equal to a determination value d. The determination processing of step S408 is based on a similarly manner to step S402. However, the determination value d may be the same as, or different from the determination value c.

If the determination result of step S408 is positive (total enlargement amount of constraint value A≤determination value d), the processing proceeds to step S410. In step S410, the manipulated variable determination section 58 updates the constraint value A with a value after the enlargement by the processing of step S406. Thereafter, the current processing cycle is ended. It should be noted that, with regard to the constraint value B, if the processing proceeds to step S410 in this way, the update of the constraint value B using a value after the enlargement by the processing of step S400 is not performed.

If, on the other hand, the determination result of step S408 is negative (total enlargement amount of constraint value A>determination value d), that is, if not only the total enlargement amount of the constraint value B exceeds the determination value c but also the total enlargement amount of the constraint value A exceeds the determination value d, the processing proceeds to step S412. In step S412, the manipulated variable determination section 58 enlarges each of the determination values c and d by the corresponding predetermined amount to update these determination values c and d. It should be noted that the determination values c and d may be enlarged by the same predetermined amount or by the respective predetermined amounts that are different from each other. After the processing of step S412, the processing proceeds to step S404. That is, after the processing proceeds to step S404 via steps S408 and S412 in this way, the update of the constraint value B using a value after the enlargement by the processing of step S400 is restarted.

9-3. Effect

According to the above-described manner of enlarging the constraint values shown in FIG. 17, first, the constraint value B having a relatively low priority order is gradually increased. If, as a result, the constraint value B has exceeded the determination value c, then the constraint value A having a relatively high priority order is gradually increased. If, as a result, the constraint value A has exceeded the determination value d, the determination values c and d are enlarged. Thereafter, the constraint value B is gradually increased again until it exceeds an enlarged constraint value c. The same applies hereinafter.

As described above, according to the present manner of the enlargement, when it is determined in step S302 that there is no primal basic solution (i.e., that the manipulated variables are not determined while complying with the plurality of constraints), the constraint values can be enlarged in sequence in ascending priority order. In addition, the present manner of the enlargement is expansively applicable to an example of three or more constraint values, instead of the example of two constraint values A and B. Because of this, it can be found that, if, for example, the present manner of the enlargement is expansively applied, the constraint values can be enlarged in sequence in ascending order of the priority orders $P_4$-$P_9$ for six constraint values (for example, Tpmn) used in step S304 of the present embodiment.

As described so far, according to the present embodiment, when six constraint values, such as Tpmn (i.e., the plurality of constraints) cannot be complied with, the manipulated variables (Te, Tg and Tm) can be determined while enlarging the constraint values in sequence in ascending order of the priority orders $P_4$-$P_9$ (i.e., while relaxing one of the plurality of constraints in sequence). Because of this, according to the present embodiment, again, by relaxing the constraints in this way as needed, it is possible to avoid that the manipulated variables are not determined.

Additionally, according to the manner of enlarging the constraint values shown in FIG. 17, the individual constraint values are gradually enlarged in ascending priority order. Because of this, it becomes possible to avoid that the manipulated variables are unable to be determined while reducing, to the minimum, the excess amounts of the control variables with respect to the respective constraint values.

(Specific Example of Changes in Constraint Values)

Figure 18:
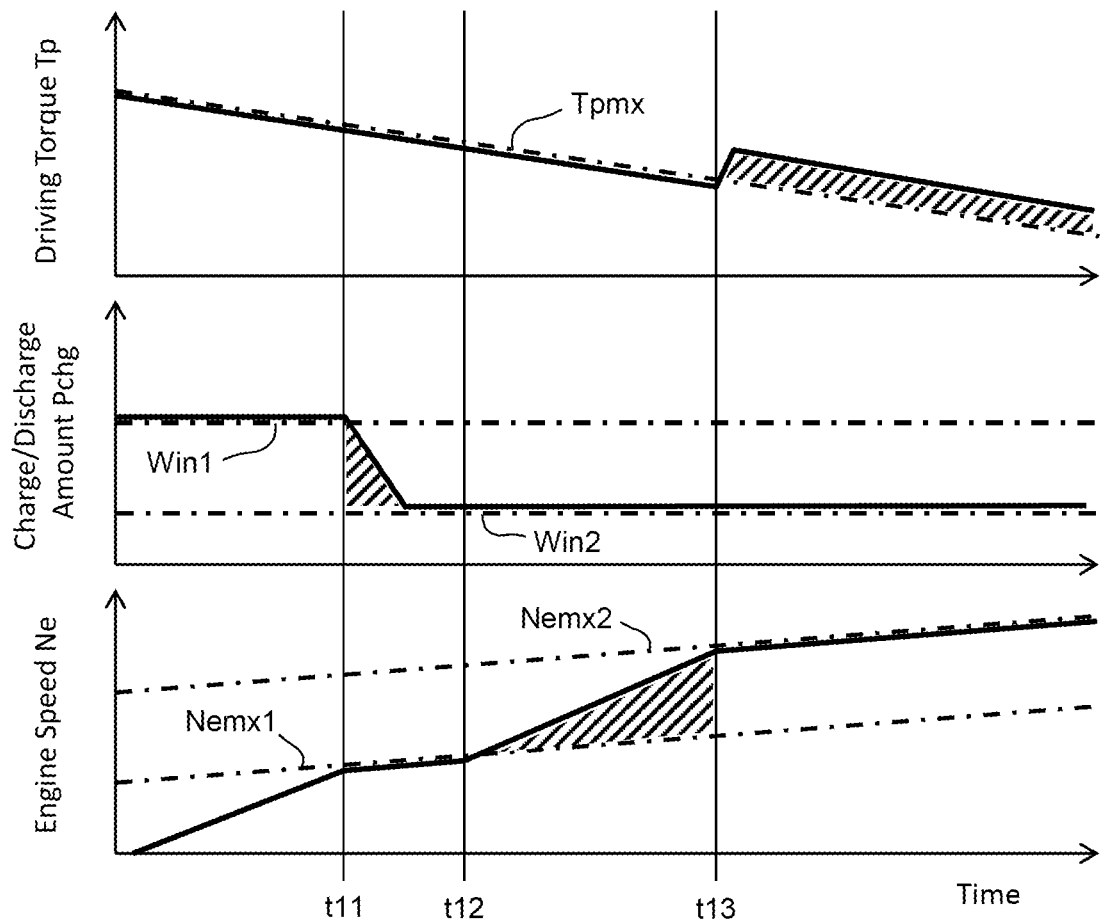
FIG. 18 is a time chart that illustrates an example of changes in constraint values of respective control variables by the manner of enlargement shown in FIG. 17.

Then, with reference to FIG. 18, an example of changes in constraint values by the manner of enlargement shown by FIG. 17 is supplementally described. FIG. 18 is a time chart that illustrates an example of changes in constraint values of the respective control variables by the manner of enlargement shown in FIG. 17.

The control variables used in the example shown in FIG. 18 are the driving torque Tp, the charge/discharge amount Pchg and the engine speed Ne, unlike the ninth embodiment. Moreover, the constraint values of the control variables used in this example are five values, that is, the upper limit constraint value Tpmx of the driving torque Tp, two lower limit constraint values Win1 and Win2 of the charge/discharge amount Pchg (Win2<Win1), and two upper limit constraint values Nemx1 and Nemx2 of the engine speed Ne (Nemx2>Nemx1). An example of the setting of the priority orders of the constraint values in this example is Nemx2>Win2>Tpmx>Nemx1>Win1. It should be noted that, in FIG. 18, all of the constraint values are represented by one-dot chain lines, and solid lines correspond to actual values of the respective control variables.

FIG. 18 represents an example of changes in the constraint values at the time of continuous downhill in which the hybrid vehicle (see FIG. 1) is going down a slope. When the hybrid vehicle is going down a slope in this manner, depression of the accelerator pedal is released and a high vehicle braking force is requested to the hybrid vehicle. In response to this request, according to the example shown in FIG. 18, the upper limit constraint value Tpmx of the driving torque Tp decreases with a lapse of time. In order to achieve a high vehicle braking force, it is effective to increase an engine braking force by increasing the engine speed Ne and to increase a regenerative braking force by increasing a negative torque of the MG 2. Accordingly, in this example, the manipulated variable determination section 58 determines the manipulated variables (Te, Tg and Tm) such that the engine speed Ne becomes higher and the charge/discharge amount Pchg approaches the lower limit constraint value Win1 to perform a regenerative power generation while controlling the driving torque Tp in the vicinity of the upper limit constraint value Tpmx that decreases as described above.

On that basis, at a time point t11 during the continuous downhill running, the engine speed Ne is reached to the upper limit constraint value Nemx1 under the condition that the driving torque Tp approaches the upper limit constraint value Tpmx and that the charge/discharge amount Pchg approaches the lower limit constraint value Win1. If the engine speed Ne exceeds the upper limit constraint value Nemx1, the manipulated variable can no longer be determined. Therefore, according to this control example, in association with a lapse of the time point t11, the lower limit constraint value Win1 whose priority order is the lowest is enlarged to the lower limit constraint value Win2. As a result, the manipulated variables can be continuously determined while complying with the upper limit constraint value Tpmx and the upper limit constraint value Tpmx.

A time point t12 thereafter corresponds to a time point at which, even if the lower limit constraint value Win is lowered to the lower limit constraint value Win2, both of the upper limit constraint value Tpmx and the upper limit constraint value Nemx1 are no longer complied with. According to this control example, in association with a lapse of the time point t12, the upper limit constraint value Nemx1 having a priority order lowest next to the upper limit constraint value Win1 is enlarged to the upper limit constraint value Nemx2. As a result, the manipulated variables can be continuously determined while complying with the upper limit constraint value Tpmx and the lower limit constraint value Win2.

At a time point t13 thereafter, the engine speed Ne is reached to the upper limit constraint value Nemx2 in a situation in which the driving torque Tp approaches the upper limit constraint value Tpmx and the charge/discharge amount Pchg approaches the lower limit constraint value Win2. If the engine speed Ne exceeds the upper limit constraint value Nemx2, the manipulated variables can no longer be determined. Therefore, according to this control example, in association with a lapse of the time point t13, the upper limit constraint value Tpmx having a priority order lowest next to the upper limit constraint value Nemx1 is enlarged by a predetermined amount. As a result, according to the example of continuous downhill running shown in FIG. 18, the manipulated variables can be continuously determined such that a desired vehicle braking force is obtained while complying with the upper limit constraint value Nemx2 and the lower limit constraint value Win2.

As can be seen from the control example shown in FIG. 18 described above, according to the measures in the ninth embodiment, the constraint values are gradually enlarged in ascending priority order. Because of this, as already described, it becomes possible to avoid that the manipulated variables are unable to be determined while reducing, to the minimum, the excess amounts of the control variables with respect to the respective constraint values. In addition, it is possible to avoid that the manipulated variables are unable to be determined while emphasizing the compliance of the constraint values having relatively high priorities (in the example shown in FIG. 18, the upper limit constraint value Nemx2 and the lower limit constraint value Win2).

9-4. Other Examples of Manner of Enlarging Constraint Values

According to the processing of the routine shown in FIG. 17, the constraint values are enlarged one by one in ascending priority order (that is, one of the plurality of constraints is relaxed at a time). However, instead of this kind of example, two or more constraint values may be enlarged at the same time in ascending priority order (that is, two or more constraints may be relaxed at the same time). To be more specific, for example, an upper limit constraint value and a lower limit constraint value for the same control variable may be enlarged at the same time. A manner described below with reference to FIG. 19 corresponds to an example of the manner of enlarging two or more constraint values at the same time by an enlarged amount different depending on the priority order (priority).

Figure 19:
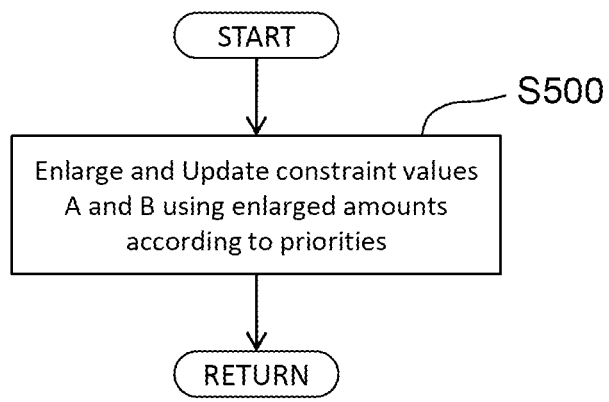
FIG. 19 is a flowchart that illustrates a routine for another example of the manner of enlarging constraint values used in the processing of step S304.

FIG. 19 is a flowchart that illustrates a routine for another example of the manner of enlarging the constraint values used in the processing of step S304 (see FIG. 16). Similarly to the example shown in FIG. 17, FIG. 19 is also associated with an example in which only two constraint values A and B are used and the priority order of the constraint value A is higher than that of the constraint value B, for ease of explanation.

According to the routine shown in FIG. 19, the manipulated variable determination section 58 executes the processing of step S500. In step S500, the constraint values A and B are enlarged by enlarged amounts different depending on the priorities (for example, priority orders), and the constraint values A and B are updated by the values after the enlargement. In detail, in step S500, the enlarged amount of the constraint value A having a relatively high priority is smaller than the enlarged amount of the constraint value B having a relatively low priority. In this manner, a plurality of constraint values may be enlarged at the same time while making a difference between the enlarged amounts in accordance with the priorities. Moreover, according to this kind of manner, similarly to the eighth embodiment, it is possible to perform "the processing to relax the plurality of second constraints while minimizing an excess amount with respect to the upper limit constraint value or the lower limit constraint value associated with each of the plurality of second constraints in descending order of the priority". It should be noted that, in contrast to the example shown in FIG. 19, the enlarged amounts of a plurality of constraint values that are enlarged at the same time may be the same as each other.

Additionally, the manner shown in FIG. 17 and the manner shown in FIG. 19 may be combined with each other. In order to provide a specific explanation of this kind of combination, an example is given in which four constraint values A, B, C and D are used and the priorities of these constraint values are set as C>D>A>B. In this example, first, the enlarged amount of the constraint value A may be smaller than that of the constraint value B, and the enlarged amount of the constraint value C may be smaller than that of the constraint value D. In addition, similarly to the manner of the routine shown in FIG. 17, the set of the constraint values A and B having relatively low priorities may be enlarged prior to the set of the constraint values C and D.

10. Other Embodiments

According to the "manipulated variable determination section 58" in the first embodiment described above, in order to determine optimal manipulated variables of the torque devices, the priorities $P_1$-$P_3$ are respectively set for a plurality of target state quantities. However, the "manipulated variable determination section" according to the present disclosure may not always be limited to the example in which the priority is used. Therefore, the manipulated variable determination section 58 may determine manipulated variables that achieve a plurality of target state quantities to the maximum extent possible without setting the priority. To be more specific, in an example in which the priority is not set, a solution to minimize, under constraints, an objective function f6 that does not include the priorities $P_1$-$P_3$ as shown in the following formula (57) may be calculated while performing a predetermined normalization with respect to a plurality of control variables (target state quantities). The normalization referred to here can be performed, for example, by setting the maximum values of the respective control variables to 1 and setting the minimum values thereof to 0.

Minimization: $f6=(y_1^-+y_1^+)+(y_2^-+y_2^+)+(y_3^-+y_3^+)$ (57)

Furthermore, according to the eighth and ninth embodiments, the priorities, such as $P_4$-$P_6$, are set for the plurality of constraint values (the plurality of constraints) of the control variables (state quantities to be controlled). However, similarly to the example of the target state quantities described above, the "manipulated variable determination section" according to the present disclosure may not always be limited to the example in which the priority is given to a plurality of constraints (which correspond to a "plurality of second constrains") on at least one of upper limit constraint value and lower limit constraint value of a plurality of state quantities (control variables).

The embodiments and modification examples described above may be combined in other ways than those explicitly described above and may be modified in various ways without departing from the scope of the present disclosure.

What is claimed is:

1. A powertrain system, comprising:
first and second torque devices associated with control of a driving force of a vehicle; and
a control device configured to control the first and second torque devices, wherein
the second torque device has a larger output response delay than that of the first torque device,
the control device is configured to act as:
a manipulated variable determination section that solves a linear programming problem to determine and output, based on a linear state equation that defines a relationship between a plurality of state quantities controlled by the powertrain system and first and second manipulated variables that are respective manipulated variables of the first and second torque devices, the first and second manipulated variables such that a plurality of target state quantities that are target values of the plurality of state quantities are maximally achieved within a plurality of constraints of the powertrain system; and
a torque device control section that controls the first and second torque devices in accordance with the first and second manipulated variables output from the manipulated variable determination section,
the plurality of constraints include, as upper and lower limit constraint values of the second manipulated variable, a maximum value and a minimum value of an attainable manipulated variable that is the second manipulated variable attainable at a next time step, and
the control device is further configured to act as a manipulated variable upper and lower limit calculation section that calculates, as the upper and lower limit constraint values of the second manipulated variable, the maximum value and the minimum value of the attainable manipulated variable, based on a rotational speed and an estimated manipulated variable of the second torque device at a current time step.

2. The powertrain system according to claim 1, wherein the manipulated variable determination section further includes a manipulated variable correction section that corrects a determined value of the second manipulated variable determined by solving the linear programming problem, the manipulated variable correction section corrects the determined value in accordance with an inverse characteristic of a response delay characteristic of the second torque device to calculate a corrected second manipulated variable in which the determined value is achieved at the next time step, and the manipulated variable determination section outputs the corrected second manipulated variable to the torque device control section.

3. The powertrain system according to claim 1, wherein the manipulated variable determination section is further configured to solve the linear programming problem to determine, within the plurality of constraints, the first and second manipulated variables that maximally achieve each of the plurality of target state quantities in descending order of priority.

4. The powertrain system according to claim 1, wherein when the first and second manipulated variables are not determined while complying with the plurality of constraints, the manipulated variable determination section determines the first and second manipulated variables while relaxing at least one of the plurality of constraints in ascending order of priority.

5. The powertrain system according to claim 4, wherein the plurality of constraints include:

one or more first constraints regarding the plurality of target state quantities; and one or more second constraints regarding at least one of upper limit constraint value and lower limit constraint value of the plurality of state quantities, and the priority given to the one or more second constraints is higher than that given to the one or more first constraints.

6. The powertrain system according to claim 4, wherein the plurality of constraints include a plurality of second constraints regarding at least one of upper limit constraint value and lower limit constraint value of the plurality of state quantities, and in relaxing the plurality of second constraints when the first and second manipulated variables are not determined while complying with the plurality of constraints, the manipulated variable determination section relaxes the plurality of second constraints while minimizing an excess amount with respect to the upper limit constraint value or the lower limit constraint value associated with each of the plurality of second constraints in descending order of the priority.

* * * * *